(12) United States Patent
Hermoni et al.

(10) Patent No.: US 11,153,177 B1
(45) Date of Patent: *Oct. 19, 2021

(54) SYSTEM, METHOD, AND COMPUTER PROGRAM FOR PREPARING A MULTI-STAGE FRAMEWORK FOR ARTIFICIAL INTELLIGENCE (AI) ANALYSIS

(71) Applicant: Amdocs Development Limited, Limassol (CY)

(72) Inventors: Ofer Hermoni, Tenafly, NJ (US); Nimrod Sandlerman, Ramat Gan (IL); Eyal Felstaine, Herzliya (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 111 days.

This patent is subject to a terminal disclaimer.

(21) Appl. No.: 16/280,320

(22) Filed: Feb. 20, 2019

Related U.S. Application Data

(60) Provisional application No. 62/660,142, filed on Apr. 19, 2018, provisional application No. 62/648,287, (Continued)

(51) Int. Cl.
*H04L 12/24* (2006.01)
*H04L 12/26* (2006.01)

(52) U.S. Cl.
CPC .......... *H04L 41/16* (2013.01); *H04L 41/046* (2013.01); *H04L 41/0622* (2013.01); (Continued)

(58) Field of Classification Search
CPC ....... H04L 41/16; H04L 43/16; H04L 41/046; H04L 41/0622; H04L 41/147; H04L 43/06
See application file for complete search history.

(56) References Cited

U.S. PATENT DOCUMENTS 10,375,095 B1 * 8/2019 Turcotte ................. H04L 67/42
2006/0265745 A1 * 11/2006 Shackleton ........... G06F 21/552
726/22

(Continued)

OTHER PUBLICATIONS

Hermoni et al., U.S. Appl. No. 16/280,245, filed Feb. 20, 2019.
(Continued)

*Primary Examiner* — Ninos Donabed
*Assistant Examiner* — Fadi Haj Said
(74) *Attorney, Agent, or Firm* — Zilka-Kotab, P.C.

(57) ABSTRACT

A system, method, and computer program product are provided for preparing a multi-stage framework for artificial intelligence (AI) analysis. In use, a first set of monitoring rules used by at least one network entity of a communication network is defined. First event log data of first network activity is collected based on the first monitoring rules, and at least one first network situation is defined. Additionally, at least one first AI model is computed based on the first event log data and the at least one first network situation. A second set of monitoring rules used by the at least one network entity is defined. Second event log data of the first network activity is collected based on the second monitoring rules. Further, at least one second AI model is computed based on the second event log data and the at least one first network situation.

11 Claims, 19 Drawing Sheets

Related U.S. Application Data filed on Mar. 26, 2018, provisional application No. 62/648,281, filed on Mar. 26, 2018, provisional application No. 62/642,524, filed on Mar. 13, 2018, provisional application No. 62/639,910, filed on Mar. 7, 2018, provisional application No. 62/639,923, filed on Mar. 7, 2018, provisional application No. 62/639,913, filed on Mar. 7, 2018.

(52) U.S. Cl.
CPC ............ *H04L 41/147* (2013.01); *H04L 43/06* (2013.01); *H04L 43/16* (2013.01)

(56) References Cited

U.S. PATENT DOCUMENTS

| | | | | |
|---|---|---|---|---|
| 2013/0227352 | A1* | 8/2013 | Kumarasamy | G06F 11/1461 714/47.1 |
| 2015/0332155 | A1* | 11/2015 | Mermoud | G06N 20/00 706/12 |
| 2017/0220407 | A1* | 8/2017 | Estrada | G06F 11/0793 |
| 2019/0261199 | A1* | 8/2019 | Salkintzis | H04W 28/10 |

OTHER PUBLICATIONS

Hermoni et al., U.S. Appl. No. 16/280,259, filed Feb. 20, 2019.
Hermoni et al., U.S. Appl. No. 16/280,265, filed Feb. 20, 2019.
Hermoni et al., U.S. Appl. No. 16/280,272, filed Feb. 20, 2019.
Hermoni et al., U.S. Appl. No. 16/280,279, filed Feb. 20, 2019.
Hermoni et al., U.S. Appl. No. 16/280,286, filed Feb. 20, 2019.
Hermoni et al., U.S. Appl. No. 16/280,301, filed Feb. 20, 2019.
Hermoni et al., U.S. Appl. No. 16/280,310, filed Feb. 20, 2019.
Hermoni et al., U.S. Appl. No. 16/280,312, filed Feb. 20, 2019.
Hermoni et al., U.S. Appl. No. 16/280,353, filed Feb. 20, 2019.
Hermoni et al., U.S. Appl. No. 16/280,367, filed Feb. 20, 2019.
Hermoni et al., U.S. Appl. No. 16/280,246, filed Feb. 20, 2019.
Hermoni et al., U.S. Appl. No. 16/280,260, filed Feb. 20, 2019.
Hermoni et al., U.S. Appl. No. 16/280,386, filed Feb. 20, 2019.
Hermoni et al., U.S. Appl. No. 16/280,634, filed Feb. 20, 2019.
Hermoni et al., U.S. Appl. No. 16/280,513, filed Feb. 20, 2019.

* cited by examiner

SYSTEM, METHOD, AND COMPUTER PROGRAM FOR PREPARING A MULTI-STAGE FRAMEWORK FOR ARTIFICIAL INTELLIGENCE (AI) ANALYSIS

RELATED APPLICATIONS

The present application claims priority to: U.S. Provisional Application No. 62/639,910, entitled "SYSTEM, METHOD, AND COMPUTER PROGRAM FOR IMPLEMENTING PRUNING RULES IN AN ARTIFICIAL INTELLIGENCE (AI) BASED NETWORK MANAGEMENT SYSTEM," filed on Mar. 7, 2018; U.S. Provisional Application No. 62/639,913, entitled "SYSTEM, METHOD, AND COMPUTER PROGRAM FOR DAMPING A FEEDBACK LOAD-CHANGE IN A COMMUNICATION NETWORK MANAGED BY AN AUTOMATIC NETWORK MANAGEMENT SYSTEM," filed on Mar. 7, 2018; U.S. Provisional Application No. 62/639,923, entitled "SYSTEM, METHOD, AND COMPUTER PROGRAM FOR IMPLEMENTING A MARKETPLACE FOR ARTIFICIAL INTELLIGENCE (AI) BASED MANAGED NETWORK SERVICES," filed on Mar. 7, 2018; U.S. Provisional Application No. 62/642,524, entitled "A METHOD AND A SYSTEM FOR MITIGATING AN ATTACK ON A NETWORK BY EFFECTING FALSE ALARMS," filed on Mar. 13, 2018; U.S. Provisional Application No. 62/648,281, entitled "SYSTEM, METHOD, AND COMPUTER PROGRAM FOR AUTOMATICALLY GENERATING TRAINING DATA FOR ANALYZING A NEW CONFIGURATION OF A COMMUNICATION NETWORK," filed on Mar. 26, 2018; U.S. Provisional Application No. 62/648,287, entitled "SYSTEM, METHOD, AND COMPUTER PROGRAM FOR IMPLEMENTING A MARKETPLACE FOR EDGE COMPUTING," filed on Mar. 26, 2018; and U.S. Provisional Application No. 62/660,142, entitled "SYSTEM, METHOD, AND COMPUTER PROGRAM FOR MITIGATING FALSIFIED LOG DATA PROVIDED TO AN AI-LEARNING SYSTEM MANAGING A COMMUNICATION NETWORK," filed on Apr. 19, 2018, the entire contents of each of the listed applications which are incorporated herein by reference.

FIELD OF THE INVENTION

The present invention relates to telecommunications and/or data communications, and more particularly to network management using multi-stage artificial intelligence (AI) analysis of log-data.

BACKGROUND

A communication network may include network entities (such as hardware components) and software components (such as virtual network functions (VNFs)), which may be reconfigured as needed. To predict situations requiring network reconfiguration, however, a network management system may use log-data collected from as many network entities as possible.

An artificial intelligence (AI) part of a network management system may include two main parts: an AI learning system and a real-time, or run-time, (RT) analysis system. The AI learning system may create at least one AI-model that the RT-analysis system may use to detect respective network situations requiring a network reconfiguration. Such AI model may analyze log-data as it is being collected.

The ability to detect a network situation, or a classifier predicting a network situation, in time to implement the required network configuration, may depend on the amount of detail associated with the analyzed log-data. However, reporting detailed log-data by each network entity, collecting and managing the detailed log-data, and analyzing the detailed log data may involve heavy load processing, communication, and storage.

As such, there is thus a need for addressing these and/or other issues associated with the prior art.

SUMMARY

A system, method, and computer program product are provided for preparing a multi-stage framework for artificial intelligence (AI) analysis. In use, a first set of monitoring rules used by at least one network entity of a communication network is defined. First event log data of first network activity is collected based on the first monitoring rules, and at least one first network situation is defined. Additionally, at least one first AI model is computed based on the first event log data and the at least one first network situation. A second set of monitoring rules used by the at least one network entity is defined. Second event log data of the first network activity is collected based on the second monitoring rules. Further, at least one second AI model is computed based on the second event log data and the at least one first network situation.

DETAILED DESCRIPTION

Figure 1:
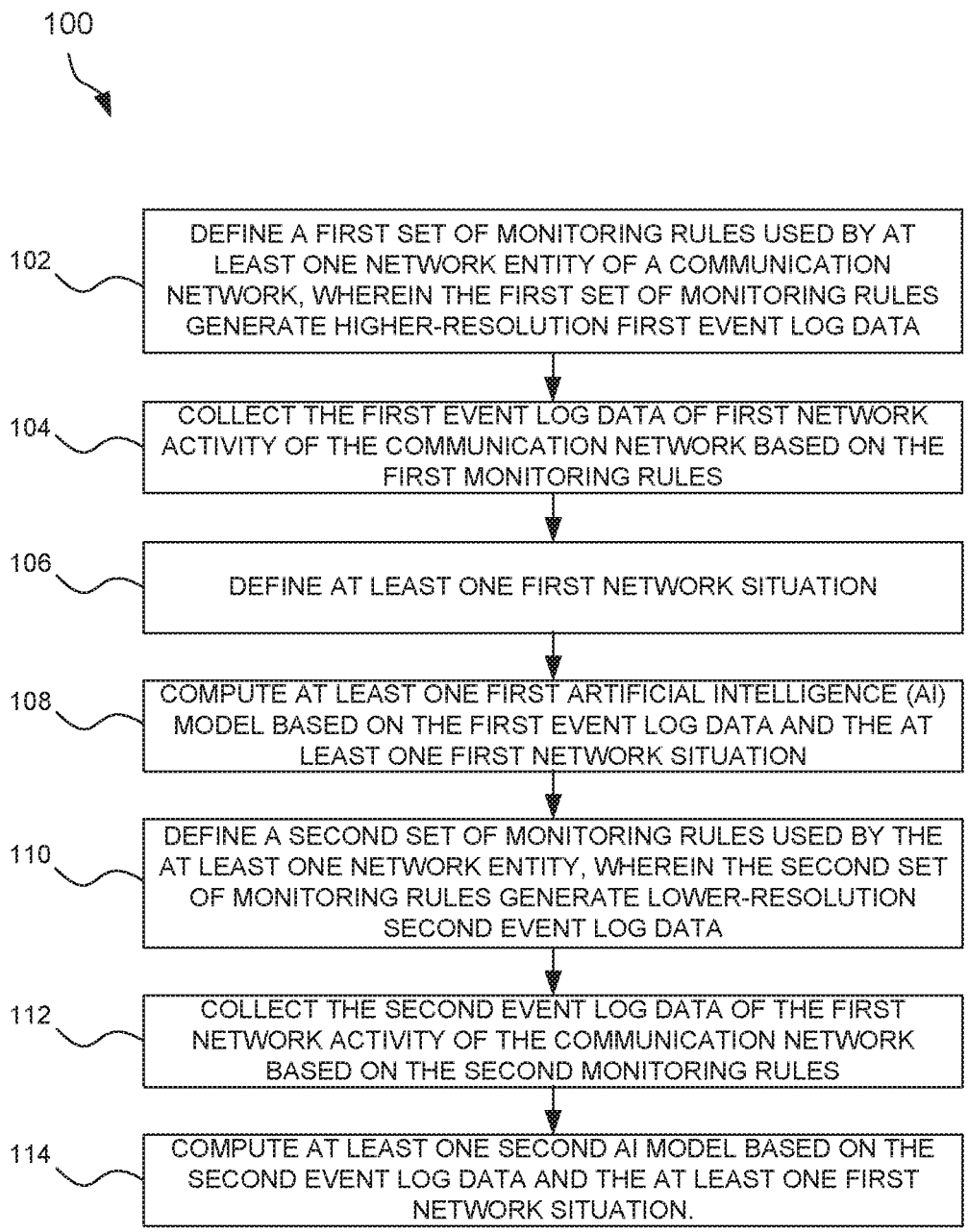
FIG. 1 illustrates a method for preparing a multi-stage framework for artificial intelligence (AI) analysis, in accordance with one embodiment.

A modern public digital communication network provides many communication-related services to a very large number of customers where each customer may use a variety of services. Additionally, each service may be used by each customer in a variety of ways. In one embodiment, the business needs of many customers may rapidly change, thereby affecting the manner in which the communication services may be used. As such, business dynamics (and especially increasing business dynamics) may affect the network dynamics, as well as the configuration of the network and the network's services.

One purpose of Network Function Virtualization (NFV) is to implement as many functions of the network as software running over a generic computer. As such, a virtual(ized) network function (VNF) can be instantiated almost anywhere on the network, based on a network/cluster of generic computers. This ability to instantiate VNFs allows network functions to be migrated throughout the network, which in turn, may lead to network reconfiguration. Additionally, fast migration and network reconfiguration may provide cost savings in both capital spending (CAPEX) and operational spending (OPEX).

In the context of the present description, the term "cost" may refer to any type of expenditure (such as associated with increased capital expenditure (CAPEX), and/or increased operational expenditure (OPEX)), as well as decreased revenues or a limitation on revenue increase. In one embodiment, OPEX may include, for example, a cost of electricity to power any network entity and/or dissipate heat resulting from the operation of any network entity. Additionally, OPEX may also include payment to any third party for using any type of hardware and/or software, including processing power, storage, transmission, etc.

Further, in the context of the present description, the term service configuration" may refer to a network configuration applicable for a particular service. Such particular service may be requested by, and/or proposed to, a particular customer (herein referred to as "requesting party"), for a specific time period, locality, and/or business structure. As such, a service configuration may apply to an entire basis or subset of a communication network(s).

For example, instead of planning a network to a combined worst case (such as a highest expected cumulative demand), CAPEX can be reduced by more accurately planning the network according to an optimized, time-dependent configuration. Thereafter, OPEX can be reduced in periods of low demand by migrating the operating VNFs to one or more central locations and shutting down unused data centers. This cost saving may be one the driving forces behind NFV. Therefore, fast and effective reconfiguration of the network may be a key element in the evolution of NFV and the telecom market.

In addition, the ability to reconfigure the network quickly (and cost effectively) may enable network operators to introduce new services faster, reduce time-to-market, and reduce onboarding costs. Fast and automatic reconfiguration also enable customers to place a demand for a service (e.g., a service level agreement or SLA) shortly before actual use, and request the service for a limited time. Together, fast and automatic reconfiguration may reduce the time and cost of doing business between network operators, operators of software service(s), and/or customers (such as consumers).

The network may be expected to adapt to a constant flow of service demands by continuously optimizing and reconfiguring the network. An optimized network (configuration) may include a network that runs close to its current maximum capacity while providing all required services (based on service level agreements (SLAs) or a similar form of service requirements definition). As the actual (real-time) demand changes, the network configuration may be changed, both by adding or removing infrastructure (e.g., turning hardware on or off), and by migrating and instantiating, or removing VNFs.

The network management system should be able to predict situations requiring network reconfiguration early enough to enable the network to compute the optimized new configuration and effect (orchestrate) it before the actual need arises. Due to the network complexity and the speed of change of demands, the use of artificial intelligence (AI) may be required to meet such a technical demand.

As such, the network management system may generally relate to telecommunications and/or data communications, and, more particularly to the management of a telecommunication network and/or a data network, and, more particularly to network management using artificial intelligence (AI).

In various embodiments, methods and systems disclosed herein may be used to manage the reporting, collecting, and analyzing of system log-data to provide log data as needed. In another embodiment, the methods and systems disclosed herein may be used to create a plurality of levels associated with network reporting, and to create detection mechanisms (such as AI models), where each reporting level and detection mechanism may enable detection of an appropriate network situation. Additionally, in one embodiment, the methods and systems disclosed herein may be used to create a multi-stage reporting and analysis mechanism, where lower resolution (less detailed) stages do not load the system, and higher resolution (more detailed) stages may provide a higher level of confidence to detect a potential or actual network situation. In other words, the multi-stage system may enable managing in real-time a mix of log-data resolutions to provide high confidence detection of network situations at a predetermined (processing communication and/or storage) load.

FIG. 1 illustrates a method 100 for preparing a multi-stage framework for artificial intelligence (AI) analysis, in accordance with one embodiment. As shown, a first set of monitoring rules used by at least one network entity of a communication network is defined, wherein the first set of monitoring rules generate higher-resolution first event log data. See operation 102. In the context of the present description, a resolution refers to a density of event logs, and/or a number of event logs per a predetermined space of time. As such, a higher resolution may refer to a higher density of event logs, and a lower resolution may refer to a lower density of event logs.

Additionally, the first event log data of first network activity of the communication network is collected based on the first monitoring rules. See operation 104. In the context of the present description, event log data may include one or more values for parameters relating to a performance of a communication network and/or to one or more network entities. Further, at least one first network situation is defined. See operation 106. In the context of the present description, a network situation may refer to a condition of a communication network that may require a configuration change, or a network reconfiguration.

In addition, at least one first artificial intelligence (AI) model is computed based on the first event log data and the at least one first network situation. See operation 108. In the context of the present description, an AI model may refer to any collection of rules generated by an AI-learning system.

In one embodiment, the at least one first AI model may be used to detect the first network activity. In an additional embodiment, the first AI model may detect a first classifier preceding the first network situation, where the first classifier includes at least one first parameter found in first prior event log data collected before the first network situation by a first time period.

Additionally, using the first AI model, the first network activity may be detected, a confidence level for the detection may be computed, and it may be determined that the confidence level exceeds a predetermined threshold. Further, in response to the determination that the confidence level exceeds the predetermined threshold, a third set of monitoring rules used by the at least one network entity may be defined, third event log data of the first network activity of the communication network based on the third monitoring rules may be collected, at least one first network situation may be determined, and at least one third AI model based on the third event log data and the at least one first network situation may be computed.

Moreover, using the first AI model, the first network activity may be detected, a confidence level for the detection may be computed, and it may be determined that the confidence level is below a predetermined threshold. Further, in response to the determination that the confidence level is below the predetermined threshold, a third set of monitoring rules used by the at least one network entity may be defined, third event log data of first network activity of the communication network based on the third monitoring rules may be collected, and at least one third AI model based on the third event log data and the at least one first network situation may be computed.

Still yet, using the first AI model, a first classifier may be detected which precedes the first network situation, where the first classifier includes at least one first parameter found in first prior event log data collected before the first network situation by a first time period. Additionally, a first confidence may be computed based on the detection, wherein the first confidence level represents a probability of the first network situation.

A second set of monitoring rules used by the at least one network entity is defined, wherein the second set of monitoring rules generate lower-resolution second event log data. See operation 110. In one embodiment, the lower resolution rule may include a resolution lower than the higher resolution rule.

Furthermore, the second event log data of the first network activity of the communication network is collected based on the second monitoring rules. See operation 112. In one embodiment, a number of data elements of the second event log data may be less than a number of data elements of the first event log data.

Moreover, at least one second AI model based on the second event log data and the at least one first network situation is computed. See operation 114. In one embodiment, the at least one second AI model may be used to detect the first network activity. In another embodiment, the second AI model may detect a classifier preceding the first network situation, where the second classifier includes at least one second parameter found in second prior log data collected before the first network situation by a second time period. Additionally, the first time period may be smaller than the second time period.

Additionally, using the second AI model, the first network activity may be detected, a confidence level for the detection may be computed, it may be determined that the confidence level exceeds a predetermined threshold. Further, in response to the determination that the confidence level exceeds the predetermined threshold, a third set of monitoring rules used by the at least one network entity may be defined, third event log data of first network activity of the communication network based on the third monitoring rules may be collected, at least one third AI model based on the third event log data and the at least one first network situation may be computed.

Moreover, using the second AI model, the first network activity may be detected, a confidence level for the detection may be computed, and it may be determined that the confidence level is below a predetermined threshold. In response to the determination that the confidence level is below the predetermined threshold, a third set of monitoring rules used by the at least one network entity may be defined, third event log data of the first network activity of the communication network based on the third monitoring rules may be collected, and at least one third AI model based on the third event log data and the at least one first network situation may be computed.

Still yet, using the second AI model, a second classifier may be detected which precedes second first network situation, where the second classifier includes at least one second parameter found in second prior event log data collected before the first network situation by a second time period. Additionally, a second confidence may be computed based on the detection, wherein the second confidence level represents a probability of the first network situation.

Figure 2A:
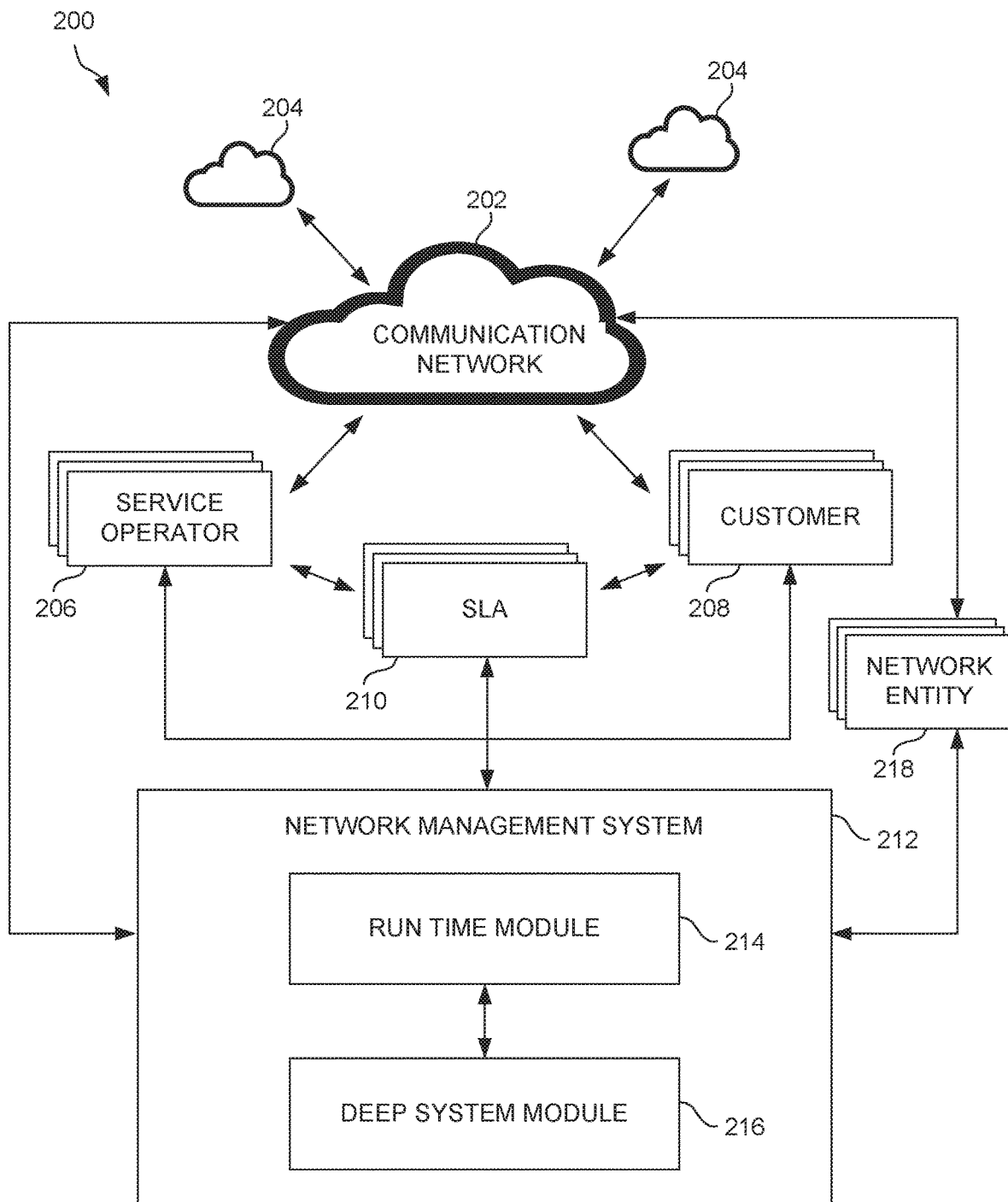
FIG. 2A illustrates a communication network and network management system, in accordance with one embodiment.

FIG. 2A illustrates a communication network and network management system 200, in accordance with one embodiment. As an option, the network management system 200 may be implemented in the context of any one or more of the embodiments set forth in any previous and/or subsequent figure(s) and/or description thereof. Of course, however, the network management system 200 may be implemented in the context of any desired environment. Further, the aforementioned definitions may equally apply to the description below.

In one embodiment, the communication network and network management system 200 may relate to managing a communication network using artificial intelligence (AI).

As shown, the network management system 200 includes a communication network 202, one or more secondary networks 204, a network management system 212 including a run-time module 214 and a deep system module 216. In one embodiment, the one or more secondary networks 204 may be communicatively coupled to the communication network 202.

Communication network 202, and/or any of the one or more secondary networks 204 may be associated with one or more service operators 206 (such as operators of third-party services such as software as a service (SaaS)), customers (such as communication customers 208 and/or consumers using the services of communication network 202 or any of the software services of service operators 206). In one embodiment, a customer of the communication network 202 may be a service operator (such as service operators 206) or a service consumer (such as the communication customers 208). Both the service operator or the service consumer may use services of the communication network 202, as well as services provided by a service provider. Further, the communication network 202 may be connected directly to the network management system 212, and/or may be connected to one or more network entities 218.

In one embodiment, the service operators 206 and/or the communication customers 208 may have an arrangement and/or agreement with an operator of communication network 202, such as one or more service level agreements (SLAs) 210, which may define various parameters of the service(s) provided by communication network 202.

In the context of the present description, the term "communication network", and/or simply "network", may refer to any type of network, including analog and/or digital communication networks, wired and/or wireless communication networks, wide area network (WAN), local area network (LAN), personal area network (PAN), etc., as well as combinations thereof. For example, network may refer to a public service telephony network (PSTN), a public service data network (PSDN), a public land mobile network (PLMN), cellular network, and/or cable network, as well as any other network type and any combination thereof. Further, the term network may include communication hardware, communication software and/or both.

A network may also refer to a sub-network, any type of a part of a network, or a combination of networks, and/or sub-networks, any of which may be overlying and/or overlapping one or more networks and/or subnetworks (such as a virtual network, and/or a network slice, etc.).

In one embodiment, a network may be operated by a network operator, a virtual network operator (VNO), a mobile virtual network operator (MVNO), a business enterprise operating one or more communication services, a business enterprise subscribing to one or more communication networks, one or more virtual communication networks, and/or one or more communication services, etc.

In the context of the present description, the term "network entity" may refer to any type of communication hardware, communication software, and/or communication service including instances of any particular software and/or service. For example, network entity may refer to software executed by a network entity (such as a network node or server), an operating-system (OS), a hypervisor software, a virtual machine, a container, a virtual network function (VNF), a micro-service, etc.

Further, in the context of the present description, the term "network configuration" may refer to any type of arrangement, configuration, topology, etc., of a network, interconnected computing devices (such as cloud computing), network nodes, servers, network entities, etc. In one embodiment, the network configuration may relate to a part (or slice) of a network, or a sub-network. Additionally, network configuration may also refer to any type of arrangement, deployment, installation, instantiation, etc. of any type of software processed and/or executed by any computational entity in the network.

In one embodiment, network configuration may refer to a configuration of any part of a network, or a combination of network, including network slicing, self-organizing networks (SON), edge computing, etc. Network configuration may also include configuration of any type of "communication service", which may include one or more network hardware elements as well as one or more software packages installed and operative in one or more hardware elements of the network.

In the context of the present description, "network service" may refer to any combination of network or communication services, facilities, or resources, as well as associated parameters such as bandwidth, latency, jitter, etc. For example, a network service may include any type of computing services, facilities, resources, as well as their parameters such as processing power, memory, storage, etc. Further, in one embodiment, network service may include a communication service, such as required network service, proposed network service, and/or communication service requirements (such as requirements specified in the SLAs 210).

Figure 2B:
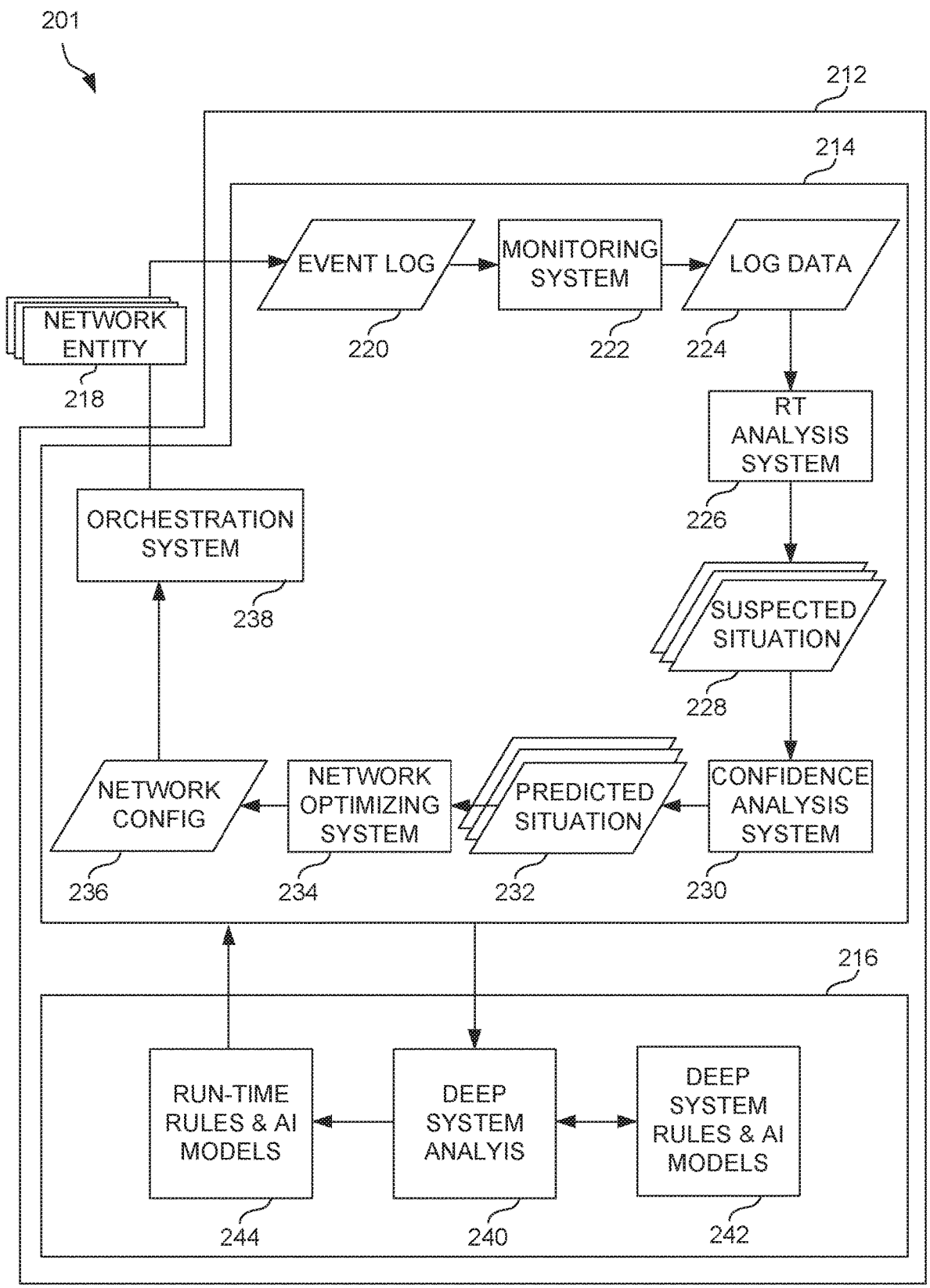
FIG. 2B illustrates a network management system, in accordance with one embodiment.

FIG. 2B illustrates a network management system 201, in accordance with one embodiment. As an option, the network management system 201 may be implemented in the context of any one or more of the embodiments set forth in any previous and/or subsequent figure(s) and/or description thereof. Of course, however, the network management system 201 may be implemented in the context of any desired environment. Further, the aforementioned definitions may equally apply to the description below.

In one embodiment, communication network 202 may include one or more network entities 218 that provide communication services of the communication network 202. For example, the network entities 218 may be arranged in a particular configuration optimized to deliver the communication services (of the communication network 202) according to the one or more SLAs 210. The network management system 212 may determine, implement and manage such optimized configuration of the network entities 218. Additionally, configuration of the network entities 218 may be associated with the deep system module 216, and in particular, the run-time module 214 through use of run time rules and/or AI-models 244, while the deep system module 216 may create, adapt and modify the run-time rules and/or AI-models 244, as well as deep system rules and/or AI models 242 by which the deep system module 216 operates.

In addition, the network management system 212 may include the run-time module 214, which may include an event log, 220, a monitoring system 222, log data 224, a real-time (RT) analysis system 226, one or more suspected situations 228, a confidence analysis system 230, one or more predicted situations 232, a network optimization system 234, network configuration 236, and an orchestration system 238. In one embodiment, the network entities 218, the monitoring system 222, the RT analysis system 226, the confidence analysis system 230, the network optimization system 234, and the orchestration system 238 may function as system components. Similarly, the event log 220, the log data 224, the one or more suspected situations 228, the one or more predicted situations 232, and the network configuration 236 may function as data elements.

The one or more network entities 218 may compute and communicate to the monitoring system 222 the event log 220, typically including values for parameters relating to the performance of the communication network 202 and/or the one or more network entities 218. The monitoring system 222 may then collect the event log 220 (including data records) to create the log data 224. RT-analysis system 226 may then analyze the log data 224 to detect the one or more suspected situations 228. Confidence analysis system 230 may then collect, compare and analyze the one or more suspected situations 228 to determine one or more predicted situations 232. Based on the current predicted situation of the one or more predicted situations 232 the network optimization system 234 may create an optimal network configuration 236. Next, the orchestration system 238 implements the optimal network configuration 236 by reconfiguring the one or more network entities 218.

In one embodiment, deep system module 216 may supervise the operation of the run-time module 214. For example, the run-time module 214 may operate on the basis of run-time rules and/or AI-models 244, which in turn are created and/or managed by the deep system analysis system 240 which operates on the basis of deep-system rules and AI models 242. The deep system analysis system 240 may be a collection of systems, arranged for example in stratified levels with their respective deep-system rules and AI models 242, as explained hereinbelow.

Further, the run-time rules and AI models 244 as well as the deep-system rules and AI models 242, may be created manually, or automatically using respective AI-learning systems operating in the deep system module 216. For example, the deep system module 216 may include any AI learning and/or RT-analysis system (including, for example, AI learning system 510 hereinbelow described). Further, the run time rules and AI models 244 as well as the deep system rules and AI models 242, may be updated, modified and/or adapted manually, or automatically using respective AI-analysis (serving) systems operating in the deep system module 216.

In one embodiment, an entity operating a network may use the network management system 212 and/or the orchestration system to manage one or more network configurations. Additionally, in the context of the present description, the term "configuration change" and/or "reconfiguration" may refer to any type of change in network configuration. In one embodiment, the type of change may include a load-change, network fault, preventive maintenance, cyber-attack, etc. Additionally, a network optimizing system (such as network optimizing system 234) and/or orchestration system (such as orchestration system 238) may analyze load conditions, requirements, and/or changes to determine if a configuration change is necessary, and if so, determine optimal configuration settings, including generating and/or applying a configuration change.

In one embodiment, a configuration change may be analyzed, determined and affected by an AI-based network optimizing system 234 and/or orchestration system 238 using one or more artificial intelligence (AI) engines. Such an AI-engine may use AI rules (e.g., AI-Model(s)), which may be created by an AI-engine using deep learning and/or machine learning technology to analyze training data based on, or sourced from, log-data. For example, the AI-based network optimizing system 234 and/or orchestration system 238 may use AI rules (AI-Models) to analyze load-changes, determine a configuration change, and/or effect an appropriate configuration change.

In the context of the present description, the term "load" may refer to any type of network characteristic, parameter, and/or service. For example, load may include bandwidth, latency, jitter, processing power, memory, storage, etc. Additionally, load may include any requirement (such as used by such network characteristic, parameter, and/or service). Additionally, the term "load-change" may refer to any change in load. For example, load-change may include a change of a load requirement, use, and/or consumption, associated with a network characteristic, parameter, and/or service. In one embodiment, load-change may cause a configuration change. As such, load-change may include other causes for a configuration change, such as a network fault, anticipated network fault (such as requiring preventive maintenance), cyber-attack and/or security breach, etc. Further, load-change may include a change in load (such as a load decrease) that may be used in turn to shut down equipment and reduce operating costs or may include an anticipated load-change which may be used to anticipate the development of a particular load-change.

Additionally, in the context of the present description, the term "log-data" may refer to any record (including a file, repository, and/or database) which may represent an event detected in the network. Such an event may be detected by one or more network nodes or servers, by software executed by such network nodes or servers, by a network management system or software (including, but not limited to, a network orchestration system or software), and/or by a network-monitoring system. Additionally, the log-data may include identification of an event (such as a network event), associated data characterizing the particular event, and/or identification of the current network configuration or topology. As such, log-data may include event-log data as well. In one embodiment, log-data may include a link to a file, repository, and/or database, or may be included within an application programming interface (API) for such file, repository, and/or database. If log-data is communicated, it may be communicated in a computer readable format such as XML.

Further, log-data may be used to train and/or test an AI-engine (including an AI-based network design and/or management system).

In the context of the present description, the term "characterization" may refer to defining any type(s) of network or communication services, facilities, resources, etc. For example, characterization may include defining a network service that is required, including associated computing services, facilities, resources, etc. In one embodiment, characterization may include the term "characteristic".

Moreover, in the context of the present description, the term "current network configuration" and/or "current network topology" may refer to a network configuration and/or topology in use at the time of logging an event and/or at the time of executing a rule. Additionally, the term "configuration representation" may refer to a mechanism that can represent a network configuration. For example, configuration representation may include software (e.g., VNF) deployment, service definitions, respective allocation of network and processing resources (e.g., bandwidth, latency, jitter, etc., processing power, memory, storage, etc.). A configuration representation may enable re-creation of a particular network configuration and/or topology, may enable simulation or emulation of the operation of a particular network configuration and/or topology, and/or may enable identification of a re-occurrence of a particular network configuration and/or topology.

Further, in the context of the present description, the term "network situation" may refer to a condition of the communication network (such as communication network 202) that may require a configuration change, or network reconfiguration. The network situation may be an unwanted situation (such as a failure), or a wanted situation (such as an opportunity to reduce cost, for example, by turning off a network entity). The network situation may be determined for the communication network (or any part of the communication network), for a service (or any part of the service), and/or for a network entity (such as one or more network entities 218), etc.

For example, the network situation may be determined for a particular SLA (such as one of the one or more SLAs 210). A network situation associated with an SLA may represent a situation where the network (or an associated service) does not perform according to the SLA. As such, the characteristics of the network situation may be any collection of parameters representing a fault or an opportunity (e.g., to reduce cost), etc. Such cause for the network situation may be associated with a load, or a load change.

Additionally, the network situation may be associated with a network fault (such as a hardware fault and/or a software fault), anticipated network fault (such as requiring preventive maintenance), cyber-attack, and/or security breach, etc.

In one embodiment, the network management system (such as network management system 212) may be used to detect a developing network situation before it adversely affects the network behavior, or to exploit an opportunity to save cost.

In this respect, in the context of the present description, the term "death expectancy" may refer to a period of time remaining for a particular predicted network situation until it adversely affects a particular service and/or SLA.

In one embodiment, the term or "minimal reconfiguration time", may refer to the minimal period required to reconfigure the network to avoid a respective failure, or to exploit a respective opportunity. For example, to resolve a predicted situation before it adversely affects the particular service and/or SLA. Therefore, the minimal reconfiguration time should be smaller than the death expectancy.

In one embodiment, resolving a particular predicted situation may be delayed until the death expectancy approaches the respective minimal reconfiguration time. Additionally, death expectancy may also refer to a period of time remaining to exploit a particular predicted situation.

Further, the term "life expectancy" may refer to a period of time where the particular network configuration may remain useful before the utility diminishes (and it may then be in need of being replaced with a different network configuration).

Figure 2C:
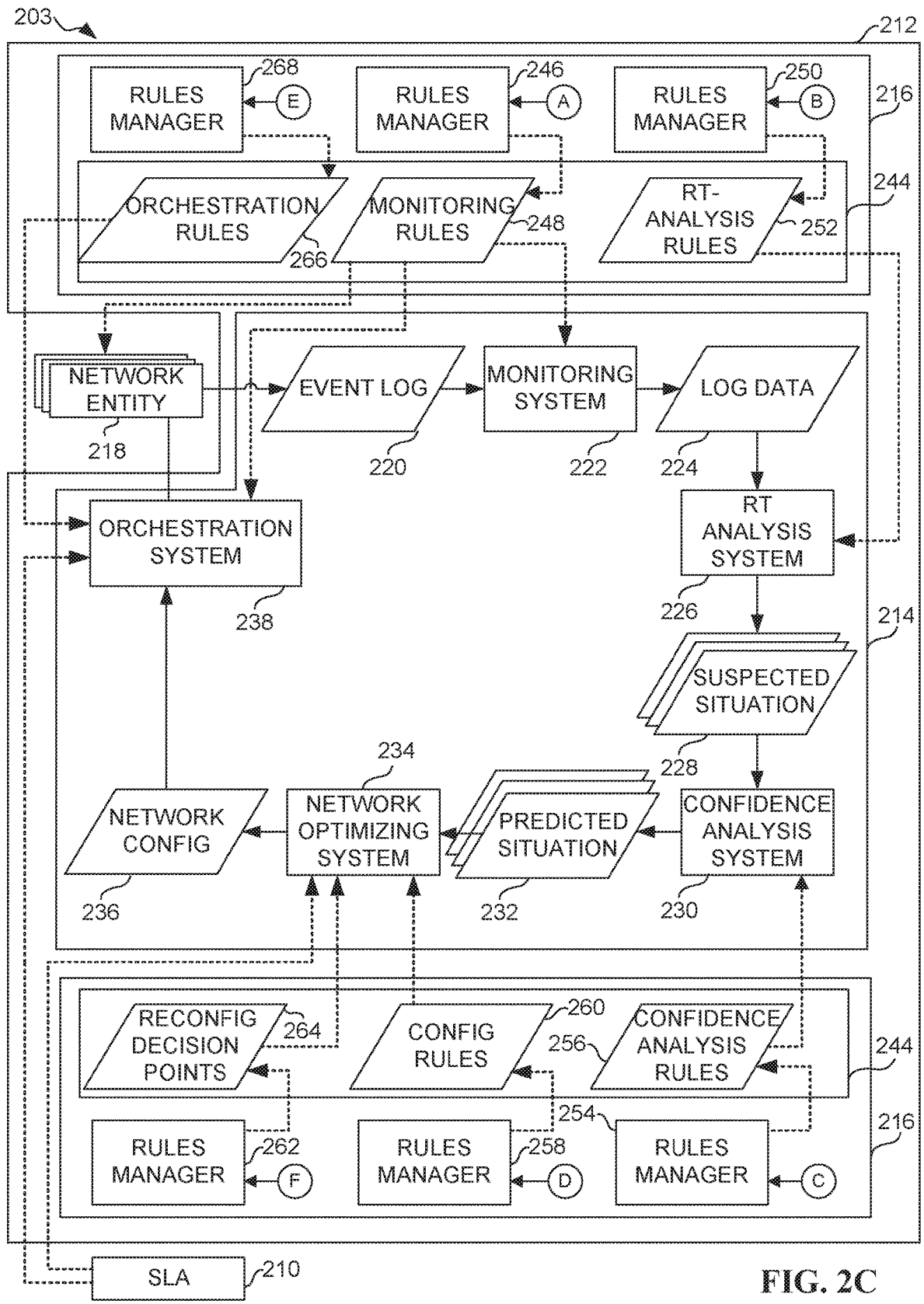
FIG. 2C illustrates a network management system, in accordance with one embodiment.

FIG. 2C illustrates a network management system 203, in accordance with one embodiment. As an option, the network management system 203 may be implemented in the context of any one or more of the embodiments set forth in any previous and/or subsequent figure(s) and/or description thereof. Of course, however, the network management system 203 may be implemented in the context of any desired environment. Further, the aforementioned definitions may equally apply to the description below.

As shown, the network management system 203 includes the network management system 212 which includes run-time module 214 and run-time rules and/or AI-models 244 of deep system module 216.

Run-time rules and/or AI-models 244 may be in communication with various components of the run time module 214, such as: monitoring rules 248 (in communication with monitoring system 222), real time (RT)-analysis rules 252 (in communication with RT analysis system 226) which may be used to analyze the log data 224 and/or to detect the one or more suspected situations 228, confidence analysis rules 256 (in communication with confidence analysis system 230) to analyze the one or more suspected situations 228 and determine the one or more predicted situations 232, configuration rules 260 (in communication with the network optimization system 234 and/or the reconfiguration decision points 264) to analyze the one or more predicted situations 232 and create network configurations 236, reconfiguration decision points 264 (in communication with configuration rules 260 and network optimizing system 234), and orchestration rules 266 (in communication with orchestration system 238) to implement the network configuration 236.

The run-time module 214 may also receive data including from SLAs 210. Of course, any of the monitoring rules 248, RT-analysis rules 252, confidence analysis rules 256, configuration rules 260, reconfiguration decision points 264, and/or orchestration rules 266 may be in communication with any specific element of run-time module 214.

Configuration rules 260 may be used by the Network Configuration 236 to create an optimal network configuration according to a network infrastructure, a current state of the network, available predictions of near-future network behavior, SLAs (or similar requirement definitions), cost considerations, available resources, etc. In one embodiment, cost considerations may include the cost of installing, updating and/or synchronizing a new network entity and/or a new virtual network function, moving data from one new network entity (and/or virtual network function) to another network entity (and/or virtual network function), and/or the cost of specific resource in a specific location, etc.

Reconfiguration decision points 264 may include network situation(s) where a new network configuration may be computed and determined. For example, a reconfiguration decision point may be determined according to a predicted situation, or a combination of predicted situations. Additionally, the network optimizing system may determine a point in time when a new network configuration may be required by applying rules associated with the reconfiguration decision points 264 (which may relate to the predicted situations 232). Additionally, a predicted situation data may contain sufficient information (such that an action can be implemented via the network optimizing system 234) about a near future predicted behavior of particular network entities. Further, the network optimizing system 234 may receive current values and corresponding near-future predictions of value changes for any and all parameters of all the network entities 218.

In the context of the present description, a reconfiguration decision point includes a situation where a new network configuration may be computed and determined. In one embodiment, a reconfiguration point may be determined according to a predicted situation, or a combination of predicted situations.

It is appreciated that each collection of rules such as monitoring rules 248, RT-analysis rules 252, confidence analysis rules 256, configuration rules 260, reconfiguration decision points 264, and orchestration rules 266, may be implemented in the form of a file, a repository, or a database. Additionally, such implementation may include a same entity (e.g., file, repository, etc.) for all rules, or may include a different entity (e.g., file, repository, etc.) for each collection of rules.

Additionally, each collection of rules may apply to one or more systems. For example, monitoring rules 248 may apply to network entities 218, monitoring system 222, and/or orchestration system 238. Monitoring rules 248 may direct each of the network entities 218 how and when to report an event log 220, including specifying parameters and/or values to report, etc. Further, monitoring rules 248 may direct monitoring system 222 how to arrange the log data 224.

Further, each collection of rules may be managed by one or more systems. For example, monitoring rules 248 may be created and/or modified by one or more administrators as well as by monitoring system 222, orchestration system 238, and/or confidence analysis system 230. Therefore each collection of rules may be managed by a rules manager, which may receive inputs via a respective hook and determine the respective rule change. In particular, monitoring rules 248 may receive input from rules manager 246, RT-analysis rules 252 may receive input from rules manager 250, confidence analysis rules 256 may receive input from rules manager 254, configuration rules 260 may receive input from rules manager 258, reconfiguration decision points 264 may receive input from rules manager 262, and/or orchestration rules 266 may receive input from rules manager 268.

In one embodiment, each collection of rules may be formed to enable simple addition, removal, selection, and/or deselection (prunning) of rules. Additionally, a system providing an input to any collection of rules (such as monitoring rules 248, RT-analysis rules 252, confidence analysis rules 256, configuration rules 260, reconfiguration decision points 264, and/or orchestration rules 266) may create a new rule, remove a rule, select/deselect (prune) a rule, and/or modify parameters of a rule.

A rules manager (such as any, some, or all of rules manager 246, 250, 254, 258, 262, and/or 268) may eliminate and/or reduce repetitive, too frequent, and/or possibly conflicting rule changes by implementing hysteresis and/or a dead-time period, a majority vote, weights and priorities, etc. For example, a system creating a rule may have priority and/or preference over any other system with respect to a particular rule. Additionally, the system may be particular to the rule managers 246, 250, 254, 258, 262 and/or 268 to prevent an over-ruling event where a first system runs-over a second (or another) system.

In the context of the present description, the term "parametrization" may refer to defining one or more values, or range(s) of values, for any characteristic of the required network or communication service, facility, resource, etc. In one embodiment, parametrization may include alternative acceptable values, or value ranges, with alternative respective priorities. The term "prioritization" may refer to defining priorities for, or between, the various required network or communication services, facilities, resources, etc., as well as their respective parameters.

Additionally, in the context of the present description, the term "weighting" may refer to defining and/or associating evaluation weights to characteristics and/or parameters for computing at least one value. In one embodiment, weighting may include a weighting factor. Additionally, the at least one value may be used for evaluating a particular proposed network service with a minimum requirement, and/or comparing between alternative proposals.

Monitoring rules 248 may instruct the one or more network entities 218 which parameters (such as parameters of the event log 220) to measure, when to measure each parameter, how to measure the parameter, and how to report any measurement. Additionally, one or more network entities may derive the rules directly from a database associated with the monitoring rules 248, or receive the rules from the monitoring system 222 periodically, or per a preconfigured schedule. In another embodiment, the monitoring rules 248 may instruct the monitoring system 222 how to measure inter-network entity parameters, including parameters involving, correlating, or synchronized between, more than one network entity of the one or more network entities 218. Further, the monitoring rules 248 may instruct the monitoring system 222 how to create, format, arrange, and/or maintain a log-data file (such as log data 224) or a database associated with the log data 224. In this manner, the monitoring rules 248 may be conditional upon network situations, and transform according to such network situations (including a progression of the network situations).

The monitoring rules 248 may additionally guide the orchestration system 238 where to instantiate a monitoring probe. After the monitoring probe is instantiated, the monitoring system 222 may instruct such probe (or a monitoring function, or any other reporting network entity) which parameter (or parameters) to measure and report, a frequency of reporting, and a timing to report, such as when a measured value crosses a particular (or preconfigured) threshold, or characteristics of a particular service follow a particular temporal pattern (such as set time intervals, etc.).

Figure 3:
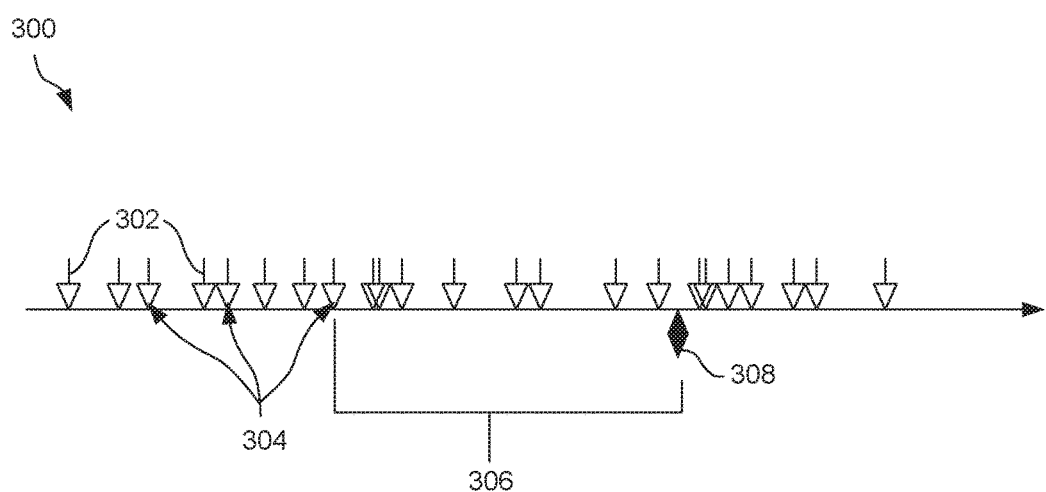
FIG. 3 illustrates an event-log timeline, in accordance with one embodiment.

FIG. 3 illustrates an event-log timeline 300, in accordance with one embodiment. As an option, the event-log timeline 300 may be implemented in the context of any one or more of the embodiments set forth in any previous and/or subsequent figure(s) and/or description thereof. Of course, however, the event-log timeline 300 may be implemented in the context of any desired environment. Further, the aforementioned definitions may equally apply to the description below.

As shown, event-log timeline 300 includes event-log records 302, including log-pattern/classifier 304, and a label for a particular network situation 308.

The log-pattern/classifiers 304 precedes the particular network situation 308 by a time period 306. The time period 306 may be a minimal reconfiguration time. In one embodiment, the time period 306 may be larger or equal to the minimal reconfiguration time. Additionally, the particular pattern of the log-pattern/classifiers 304 may be construed as a classifier for the particular network situation indicated by a label for the particular network situation 308.

Figure 4A:
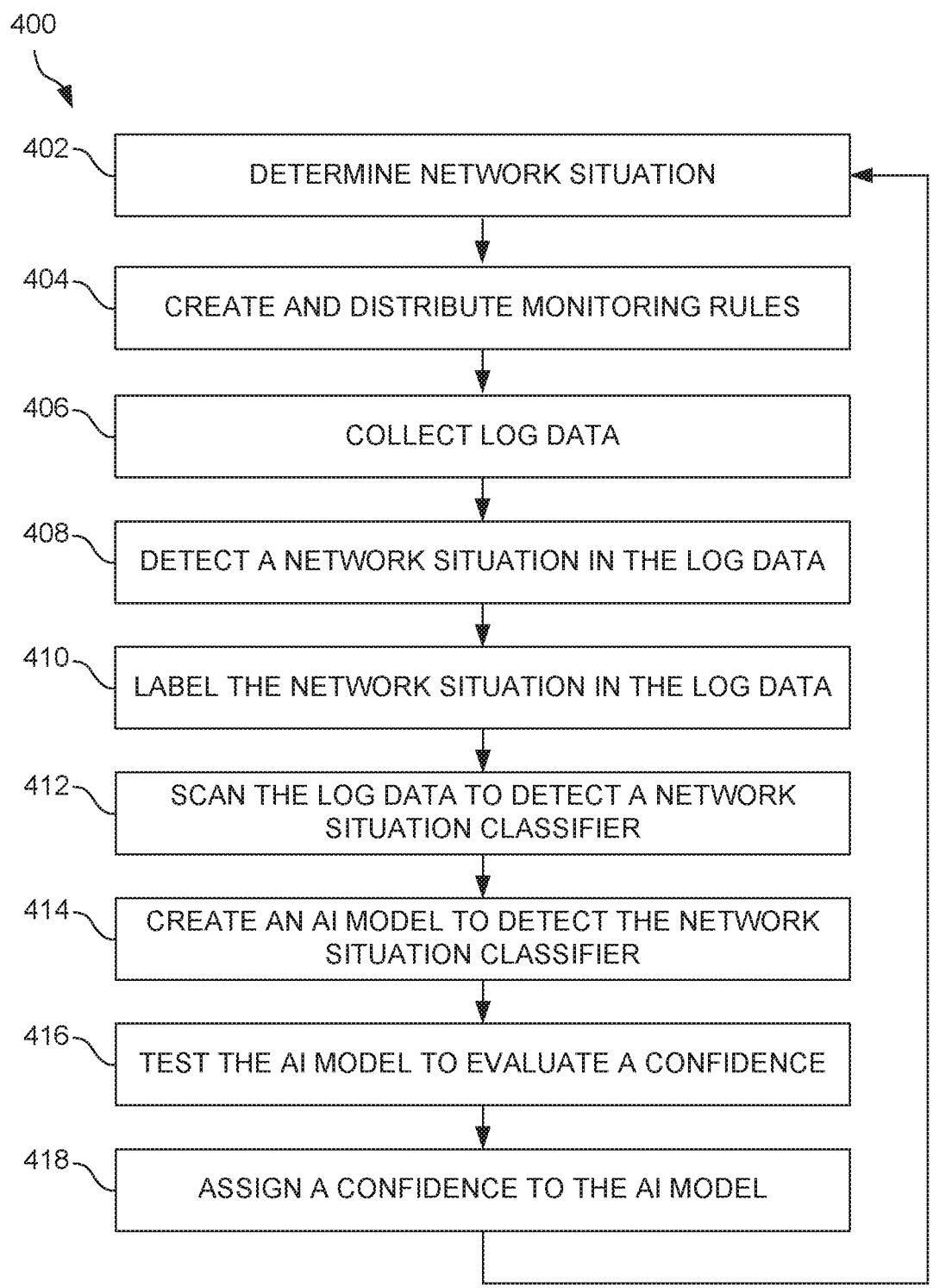
FIG. 4A illustrates a method for processing log data, in accordance with one embodiment.

FIG. 4A illustrates a method 400 for processing log data, in accordance with one embodiment. As an option, the method 400 may be implemented in the context of any one or more of the embodiments set forth in any previous and/or subsequent figure(s) and/or description thereof. Of course, however, the method 400 may be implemented in the context of any desired environment. Further, the aforementioned definitions may equally apply to the description below.

Method 400 shows part of log data (such as the log data 224) processed for creating an AI-model. In one embodiment, the method 400 illustrates a flow chart of a process for creating an AI-model for the RT analysis system 226. As shown, a network situation is determined. See operation 402. In one embodiment, determining the network situation may include also determining particular characteristics of the network situation. For example, a network situation may be an unwanted situation (such as a failure), or a wanted situation (such as an opportunity to reduce cost, for example, by turning off a network entity). A network situation may be determined for a network (or any part of a network), for a service (or any part of a service), for a network entity (such as network entities 218), etc. For example, a network situation associated with an SLA may represent a situation where the network (or an associated service) does not perform according to the SLA. As such, the characteristics of the network situation may be any collection of parameters representing a fault or an opportunity (e.g., to reduce cost), etc. Such cause for the network situation may be associated with a load, or a load change.

At operation 404, monitoring rules may be created and/or distributed. Such monitoring rules may be used to instruct a relevant network entity (of the network entities 218) to measure and report one or more parameters that may be relevant to a network situation(s). Additionally, the monitoring rules may instruct the network entity when to measure each parameter, and how to report any measurement. In one embodiment, a rate of measuring a parameter may be different (such as being more frequent) than a rate of reporting. Further, the reporting may be conditioned by a value measured (or calculated), such as an average value, rate of change of value, etc. Moreover, the monitoring rule may include instructions to locally store unreported measurement(s) for a predetermined span of measurements and/or time.

In another embodiment, a monitoring rule may instruct one or more network entities 218 and/or the monitoring system 222 to report values of parameters and/or characteristics for a particular service in a particular temporal pattern. For example, the event log 220 the or log data 224, may report a timely value of a parameter, or the time in which the value of a parameter crossed a predetermined threshold value, etc.

At operation 406, event-log records are collected, including, log data which may be relevant to the network situation as determined by the characteristics of the network situation.

Additionally, a network situation in the log data is detected in the log data. See operation 408. In one embodiment, the network situation may be detected based on characteristics of the network situation. At operation 410, the network situation in the log data is labeled. Further information relating to the log data and/or the event-log data may be found in FIG. 4.

At operation 412, the log data (such as log data 224) is scanned to detect a network situation classifier. In one embodiment, the log data may include training files used to determine a particular pattern of particular event-log records. Additionally, one or more training files may be created based on such log data. In one embodiment, the network situation classifier may include a particular sequence of parameter value(s) carried by log-data (such as log data 224). Additionally, it may precede and/or predict, a network situation. Further, the particular sequence of parameter value(s) may be specific to a configuration of network entities (such as network entities 218) and services, as well as to the set of monitoring rules (such as monitoring rules 248) executed at that period.

At operation 414, an AI model is created to detect the networks situation classifier. For example, in one embodiment, one or more RT-analysis rules 252 (e.g., a rule-base) may be created for detecting the particular networks situation classifier. In the context of the present description, this rule-base, when created by an AI learning system (such as the RT analysis system 226), may be considered an "AI-model". It is to be appreciated that this network situation classifier and the respective AI-model (i.e., rule-base) may be particular to the network configuration for which the log data (such as log data 224) is collected. In one embodiment, the one or more RT-analysis rules 252 may be implemented as AI models created by an AI learning system (such as RT-analysis rules 252 that may be used by the RT analysis system 226 to detect a classifier in the log data 224).

Additionally, in the context of the present description, the term "particular rule-base" may refer to a rule-base derived from a data-set associated with a particular network configuration and/or topology, or a particular spectrum of network configurations and/or topologies. Further, a particular rule-base, especially in the context of an AI-learning system, may be equivalent to the term "AI-Model". AI-Model may therefore include any collection of rules generated by an AI-learning system, including a deep-learning system and/or a similar entity. The AI-Model may include data relating to a neural-network.

Further, the AI model may be tested to evaluate a confidence level. See operation 416. For example, the AI model may be tested using testing files, including testing files created from log data (such as the log data 224). The AI-model may be tested for a particular network situation classifier. Additionally, a measure of the confidence level may be calculated relating to the detection of a particular network situation classifier (such as an event-log pattern) by the particular AI-model. It is to be appreciated that this networks situation classifier and the respective AI-model may be particular to a specific network configuration for which the log data is collected.

In the context of the present description, the term "confidence level" may refer to any measure of confidence of detecting a classifier, and/or an event-log pattern, that may be associated with a particular suspected situation and/or predicted situation. For example, the confidence level may be measured/calculated according to a percentage of false-positive and/or false-negative detection of the particular classifier, and/or an event-log pattern. The measure of confidence level may represent a probability that, based on a particular suspected situation and/or predicted situation being detected, the particular suspected situation and/or predicted situation will develop. Further, confidence level may be represented simply by "confidence" particularly when associated with a confidence analysis such as a confidence analysis system and/or confidence analysis rules.

At operation 418, a confidence may be assigned to the AI model. For example, the AI-model may be outputted with a specific confidence level to a database associated with the RT-analysis rules 252. In one embodiment, the database may include RT-Analysis Rules 252 and thus may be accessed by the RT analysis system 226. Further, the database may be linked to the RT analysis system 226 and may contain the RT-Analysis Rules 252. After assigning a confidence to the AI model, method 400 may be repeated (starting back at operation 402) for any number of network situations, and/or to amend the confidence of the AI model based on an updated network situation.

In one embodiment, the RT-analysis rules 252 for a particular predicted situation may include a rules-base (such as an AI model) for detecting a sequence of event-log data (such as log data 224) preceding the predicted situation, and/or for reporting current values and corresponding near-future predictions of parameter value(s) changes in relation to any and/or all of the network entities 218 involved.

Figure 4B:
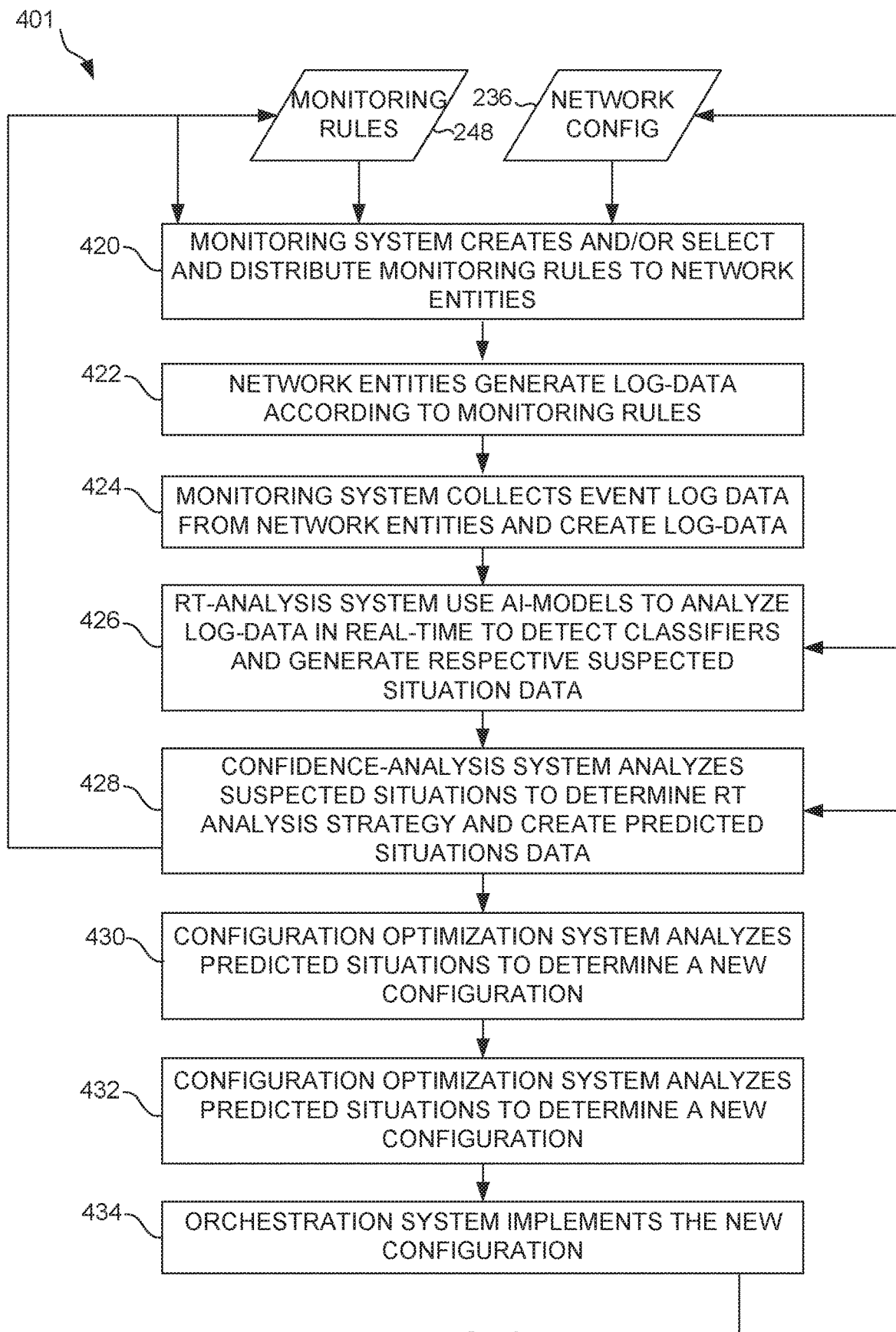
FIG. 4B illustrates a method of a run time process using an AI-model, in accordance with one embodiment.

FIG. 4B illustrates a method 401 of a run time process using an AI-model, in accordance with one embodiment. As an option, the method 401 may be implemented in the context of any one or more of the embodiments set forth in any previous and/or subsequent figure(s) and/or description thereof. Of course, however, the method 401 may be implemented in the context of any desired environment. Further, the aforementioned definitions may equally apply to the description below.

In one embodiment, the method 401 may show a run-time process which may be used by the run-time module 214. In one embodiment, the run-time module 214 may use the method 401 using an AI-model as may be created by the method 400. Additionally, in another embodiment, the method 401 may be executed continuously as a main loop (without a start or end point). Further, the steps of the method 401 may be executed in parallel, or simultaneously, by various systems (such as but not limited to the monitoring system 222, the RT analysis system 226, the confidence analysis system 230, the network optimizing system 234, the orchestration system 238) of the network management system 212.

As shown at operation 420, the monitoring system 222 may create and/or select and distribute the monitoring rules 248 to the network entities 218. In one embodiment, the monitoring rules 248 may be distributed based on a current network configuration. The monitoring system 222 may receive the current network configuration from the orchestration system 238. Further, the monitoring system 222 may continue to create and/or select and distribute the monitoring rules 248 to the network entities 218 as needed.

At operation 422, the network entities 218, using the monitoring rules 248, may generate and send the event log 220 to the monitoring system 222. The network entities 218 may generate and send the event log 220 continuously as needed.

At operation 424, the monitoring system 222 may collect the event log 220 from the network entities 218 and may create the log data 224 (which may be run-time log data). The monitoring system 222 may continue to create the log data 224 continuously.

At operation 426, the RT-Analysis system 226 may use the AI-Models of the RT-Analysis Rules 252 to analyze the log data 224 in real-time to detect the log-pattern/classifiers 304 and generate the respective data for the suspected one or more suspected situations 228. Operation 426 may also be executed continuously, as RT-Analysis system 226 may receive from the monitoring system 222 new log-data 224, detect more log-pattern/classifiers 304, and generate more data for the one or more suspected situations 228. Each of the one or more suspected situations 228 may be associated with a respective confidence level, which may indicate a probability of occurrence of the respective network situation within a particular time period (such as the time period 306).

Additionally, at operation 428, the confidence analysis system 230 may analyze the suspected situations 228 and their respective confidence levels to determine and adapt the RT appropriate analysis strategy. For example, the confidence analysis system 230 may request the monitoring system 222 to create and/or select and distribute the monitoring rules 248 to the network entities 218 to increase the probability of detecting a log-pattern/classifiers 304, and/or to increase the confidence level of a respective suspected situation 228. In one embodiment, the confidence analysis system 230 may generate respective data of the predicted situations 232, such as where a respective confidence level reaches a predetermined threshold. The confidence analysis system 230 may process operation 428 continuously and/or repeatedly as the suspected situation 228 may be further received from the RT-Analysis system 226.

At operation 430, the network optimization system 234 may analyze the predicted situations 232 to determine a new network configuration 236. The network optimization system 234 may process the RT-Analysis system 226 continuously and/or repeatedly as the predicted situations 232 may be further received from the confidence analysis system 230.

Further, at operation 432, the orchestration system 238 may receive from the network optimization system 234 a new network configuration 236 and implement it (at operation 434) by modifying, migrating, installing and/or removing the network entities 218. The orchestration system 238 may process operation 432 continuously and/or repeatedly as the network configuration 236 is further received from the network optimization system 234. As a new network configuration is implemented, the monitoring system 222 may create and/or select and distribute the monitoring rules 248 to the respective network entities 218, and the RT analysis system 226 may select and/or use the respective AI-models included in the RT-Analysis Rules 252.

Additionally, the network optimizing system 234 may determine the network configuration 236 that the orchestration system 238 may then implement to avoid or exploit one or more of the predicted situations 232. Implementing a new network configuration 236 may result in a configuration change or a network reconfiguration. The network optimizing system 234 may determine which of the pending predicted situations 232 should be treated (e.g., avoided or exploited) in the subsequent configuration change.

In one embodiment, the network optimizing system 234 may determine a new network configuration 236 while the orchestration system 238 may still be implementing another (e.g., previously instructed) configuration change (of a previously implement network configuration 236). For example, the network optimizing system 234 may instruct parallel configuration changes affecting different parts of the communication network 202 and/or different network entities 218, and/or different services.

As such, the network optimizing system 234 may consider several parameters that may affect a decision associated with a reconfiguration of the network. Such parameters may include cost, priority, severity, confidence level, death expectancy of the pending predicted situation, life expectancy of a new configuration, collision with another reconfiguration currently processed by the orchestration system 238, etc. In the context of the present description, the term "minimal reconfiguration time" may refer to a minimal time required by an orchestration system (such as orchestration system 238) to migrate one or more network entities (such as network entities 218). In one embodiment, minimal reconfiguration time may be associated with a particular service and/or SLA, and, more particularly but not exclusively, with a particular network situation associated with the service and/or SLA.

In one embodiment, a configuration change (such as implemented via the network optimizing system 234 or the orchestration system 238) may be tagged, identified, and/or associated with one or more particular causes and effects and/or result (such as a particular load-change, requirement, fault, cyber-attack, etc.). For example, the network optimizing system 234 and/or orchestration system 238 may tag and/or associate a configuration change with one or more of the causes for a particular configuration change. Additionally, each tag or association may be assigned a weighting factor representing the effect of a particular cause on determining the particular configuration change.

Further, configuration settings may be stored as a data record or a data field in a file or a database (such as a database associated with network optimizing system 234). The data field or data record may include a start and stop time of the respective configuration, and the format of the data field or data record may enable a software package to identify the differences between two (or more) configurations represented by their respective data field or data record.

In the context of the present description, the term "difference measure" may refer to a value representing a difference between two (or more) configurations. Additionally, the term "dislocation" may refer to an entity located in a configuration which differs from the location noted in a reference configuration. A dislocation may refer to a missing entity, an added entity, and/or an entity located in a different place. Such entity may be any hardware component and/or a software component, such as a VNF instance, and/or a service, such as a micro-service.

In various embodiments, training and/or testing data may be derived from the same data-set (including log-data). Additionally, the training data may be used to train the AI-engine to produce a rule-base, and the testing data may be used to evaluate the effectiveness of the developed rule-base.

The network optimization system 234 may determine the network configuration 236 which the orchestration system 238 may then implement to avoid or exploit one or more predicted situations. In one particular situation, implementing a new network configuration may result in a configuration change or a network reconfiguration. As such, the network optimization system 234 may determine which of the pending predicted situations should be treated (e.g., avoided or exploited) during the next configuration change.

Additionally, the network optimization system 234 may determine a new network configuration while orchestration system 238 may still be implementing another (e.g., previously instructed) network configuration 236. For example, network optimization system 234 may instruct parallel configuration changes affecting different parts of communication network 202, network entities 218, and/or different services.

In one embodiment, the network optimization system 234 may consider a variety of parameters which may affect a reconfiguration decision, including but not limited to, cost, priority, severity, confidence level, death expectancy of the pending predicted situation, life expectancy of the new configuration, collision with another reconfiguration currently processed by the orchestration system 238, etc. These parameters may also be considered in the context of processing the reconfiguration decision points 264 by the network optimizing system 234.

Additionally, it is to be appreciated that a configuration or reconfiguration change may directly affect cost. For example, a configuration change may involve migration of a software entity from one hardware entity to another. Such a migration may be executed in the form of "make before break", so as not to disrupt or adversely affect any service. This operation may mean that software entity B is installed, operated and updated in hardware entity B before software entity A is removed from hardware entity A. Therefore, software entity A and software entity B may be operative in parallel, and may each be implemented on a specific hardware entity, thereby increasing cost, including hardware, electricity, maintenance (including dissipating heat from hardware) costs, as well as third party costs including processing, storage, communication, licensing, etc. Furthermore, any additional costs (including extra hardware entities, etc.) may obviously affect the ability to generate income using the particular hardware entity.

Additionally, a configuration or reconfiguration change may be subject to priorities (such as due to limited resources). For example, migrating a first software entity from hardware entity A to hardware entity B may adversely affect the ability to migrate a second software entity to hardware entity A or to hardware entity B, as well as to any other hardware entity depending on a communication facility and/or hardware entity involved in the migration of the first software entity.

In one embodiment, the network optimization system 234 may use at least two sets of rules including configuration rules (which may determine how to resolve one or more predicted situations by an optimal reconfiguration) and reconfiguration decision points 264 (which may additionally determine when to resolve pending predicted situations).

In one embodiment, based on the processing of the reconfiguration decision points 264, the network optimization system 234 may determine which of the pending predicted situations to process for the next network configuration and when to process such pending predicted situations. For example, the network optimization system 234 may determine based on a reconfiguration condition point (of the reconfiguration decision points 264), whether to effect a reconfiguration immediately, or to delay a reconfiguration based on, for example, a combination of long death expectancy and low confidence level. In one embodiment, a reconfiguration may be delayed until a confidence level increases.

Additionally, the deep system module 216 may include processes (e.g., modules, systems) that may create and modify run-time rules. In one embodiment, the deep system module 216 may be construed as a -reverse analysis channel as it may use the output of the run-time module 214 to manage run-time rules. In other words, the deep system module 216 analyzes the behavior of the run-time module 214 so as to improve it by optimizing the rules controlling the behavior of the run-time module 214, such as adaptive pattern recovery and/or behavioral patterns.

Figure 5:
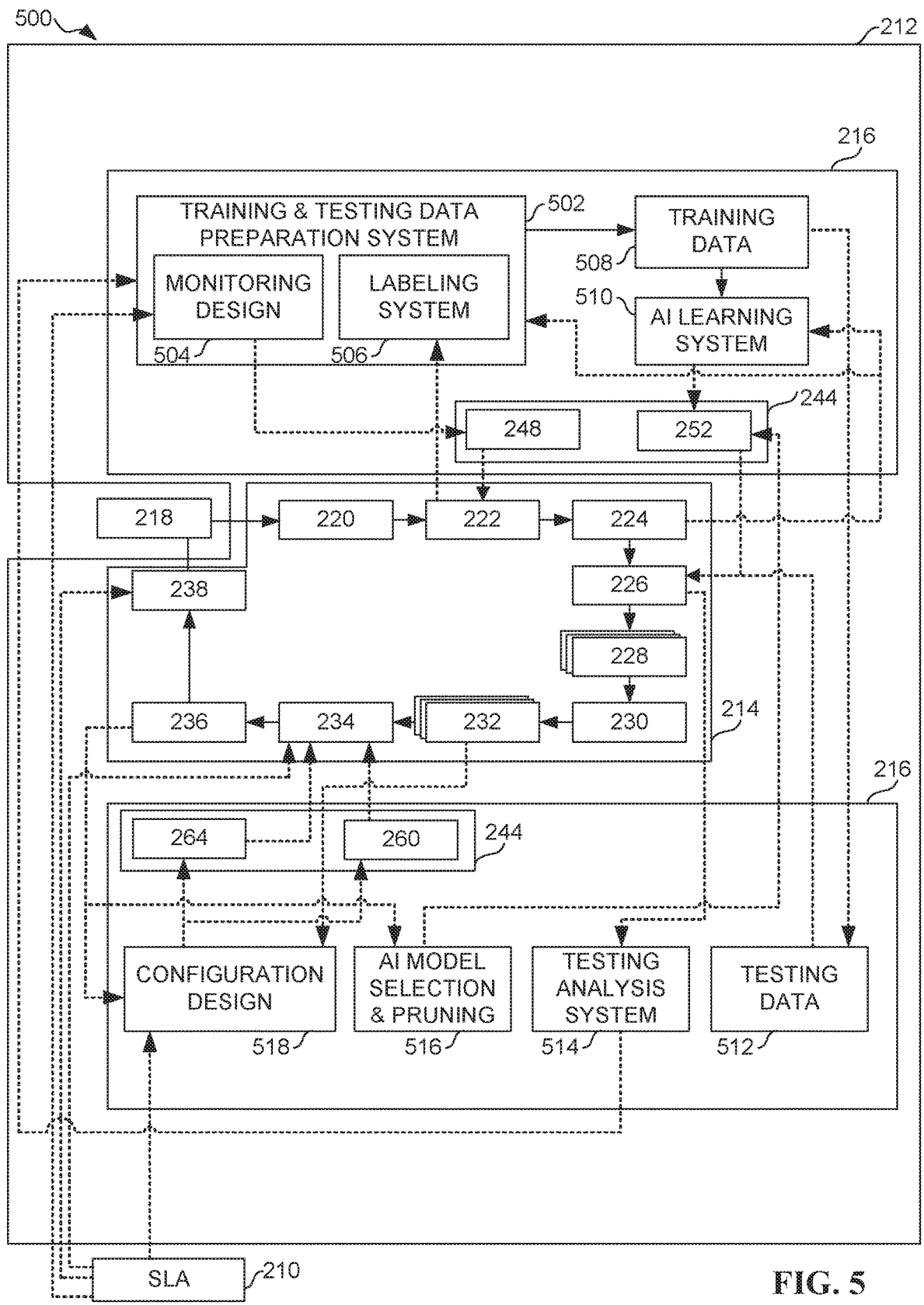
FIG. 5 illustrates a network management system, in accordance with one embodiment.

FIG. 5 illustrates a network management system 500, in accordance with one embodiment. As an option, the network management system 500 may be implemented in the context of any one or more of the embodiments set forth in any previous and/or subsequent figure(s) and/or description thereof. Of course, however, the network management system 500 may be implemented in the context of any desired environment. Further, the aforementioned definitions may equally apply to the description below.

As shown, an AI learning system 510 which may produce the RT-analysis rules 252 (or the AI-models, or predictors). The AI learning system 510 may analyze training data and/or testing data that is created from the log data 224 to produce RT-analysis rules 252. Additionally, the AI learning system 510 may receive as input the log data 224.

Additionally, the training and testing data preparation system 502 may include a monitoring design module 504 and a labeling system 506. Labeling system 506 may convert log-data (such as the log data 224) into training-data and testing-data for the AI learning system 510. The labeling system 506 may label training-data and testing-data. In one embodiment, the labeling system 506 may determine where to properly mark network situations in the training-data and/or testing-data. In one embodiment, the labeling system 506 may receive as input the log-data 224 from the monitoring system 222. In one embodiment, the log-data inputted to the labeling system 506 may be separate from the log data 224. For example, in one embodiment, the monitoring system 222 may provide separate log-data to the labeling system 506. The output of the labeling system 506 includes training data and testing data (based on log-data with labels of network situations). The output of the monitoring design module 504 includes monitoring rules adapted to particular network situations.

In one embodiment, the monitoring design module 504 may create and distribute monitoring rules to one or more relevant network entities such that that network situations and their respective classifiers can be detected. Additionally, a network situation may depend on a network configuration and/or the monitoring rules (such as the monitoring rules 248) which may depend on the network situations and/the network configuration.

Additionally, the monitoring design module 504 may optimize monitoring rules to improve the log-data collected and provided to the training and testing data preparation system 502 such that predicted situations can be predicted more accurately and/or earlier, and to enable detection of more or new predicted situations. The output of the training and testing data preparation system 502 may be provided as training data 508, which in turn, may be sent to the AI learning system 510.

As shown, the configuration design system 518 may optimize configuration rules (such as configuration rules 260 and/or reconfiguration decision points 264) to improve the results of the network configuration system. To that end, the configuration design system 518 may receive inputs from the run-time module, including the network configuration 236 and/or one or more predicted situations 232, as well other network parameters, including SLAs 210. Additionally, the configuration design system 518 may measure the quality of the computed network configuration, including a cost of a reconfiguration, time required to reconfigure the network, a length of time the configuration has lasted, etc. In one embodiment, the configuration design system 518 may include goals for the network reconfiguration.

Additionally, an AI model selection & pruning 516 system may receive the network configuration 236 and based on such, may select and prune network configurations, resulting in RT-analysis rules 252. Further, testing analysis system 514, may receive an output from the RT analysis system, and may provide such data as input to the training and testing data preparation system 502.

Figure 6:
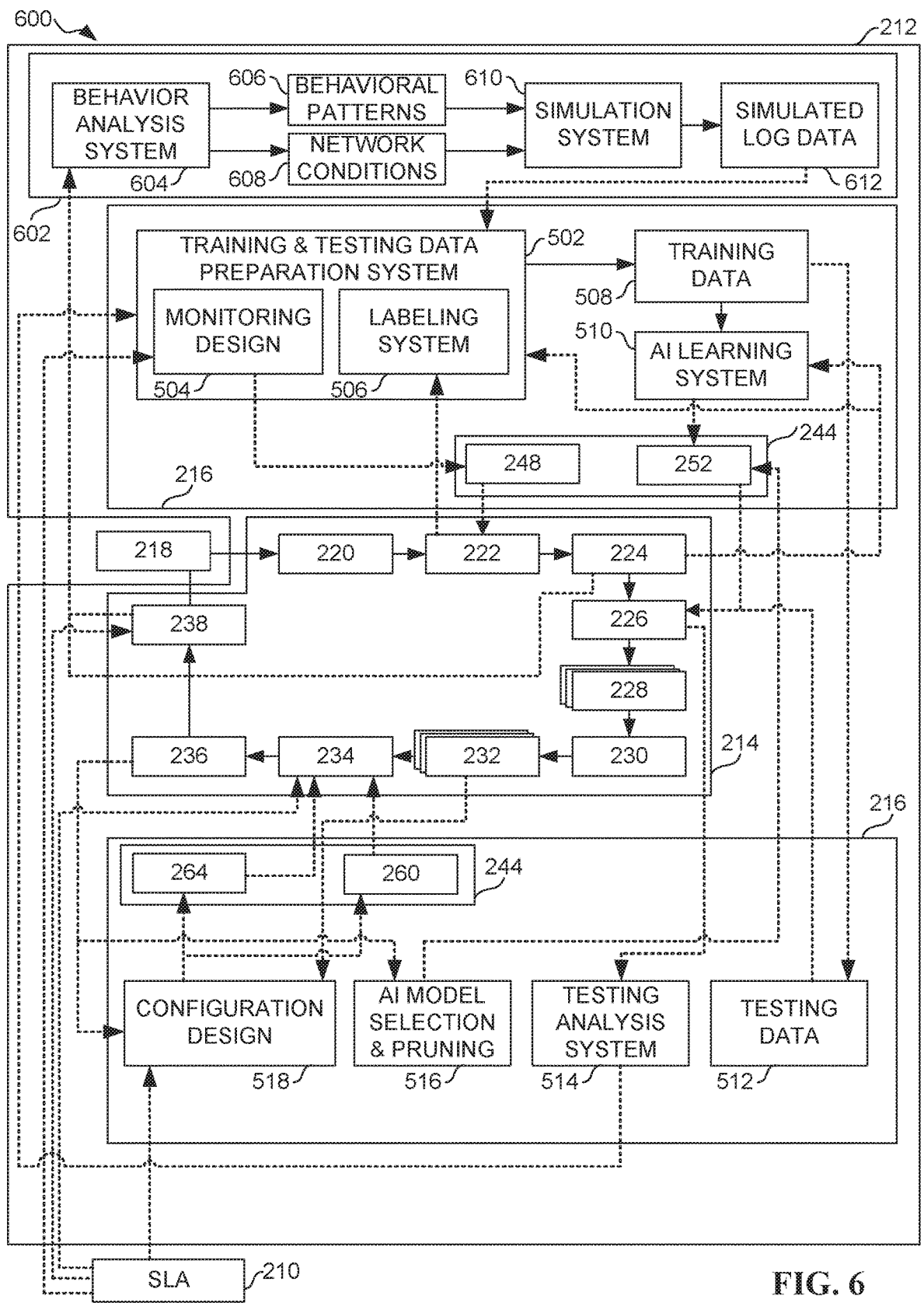
FIG. 6 illustrates a network management system, in accordance with one embodiment.

FIG. 6 illustrates a network management system 600, in accordance with one embodiment. As an option, the network management system 600 may be implemented in the context of any one or more of the embodiments set forth in any previous and/or subsequent figure(s) and/or description thereof. Of course, however, the network management system 600 may be implemented in the context of any desired environment. Further, the aforementioned definitions may equally apply to the description below.

As shown, the network management system 600 builds upon the network management system 500. In one embodiment, the network management system 600 may be used to simulate network behavior when there is no sufficient amount of log-data (which may result from network dynamics, including new network configurations). In such a situation, log-data may be simulated or synthesized. In particular, simulating log-data may include analyze the network behavior to produce primitives that may then be used as components from which training data is composed/synthesized/simulated.

A higher level of the deep system module 216 of the network management system 212 may include processes (e.g., modules, systems) that simulate a network behavior when there is not enough log-data (such as the log data 224). Insufficient log data may result from network dynamics. As demand changes and shifts more rapidly and more frequently, particular network configurations may not produce sufficient log-data. Additionally, network configurations may be new (thereby having no history of log-data). As such, there may be a need to simulate (or synthesize) log-data. The simulation level (corresponding with the simulation module 602) may include a collection of mechanisms that analyze the network behavior to produce "primitives". The primitives in turn may be used as a simulation of training-data and testing-data for a new configuration.

In one embodiment, the simulation module 602 may include a behavior analysis system 604, which may produce several primitives, including behavioral patterns 606 and network conditions 608. In one embodiment, the behavioral patterns may include sequences of event-log data (such as log data 224) produced by a network entity (of the network entities 218), or a particular virtual network function (or a similar entity), that are characteristic of a particular arrangement such as a timing to serve a particular service to a particular customer.

At simulation system 610, log-data may be simulated or synthesized for a particular configuration, including arranging, interlinking, and interleaving, behavioral patterns. As such, the behavioral patterns 606 should be properly detected, defined, and characterized, such that they can be properly selected and combined in the process of simulating, or synthesizing, log-data as shown in simulated log data 612.

Additionally, network conditions 608 include situations that may be predicted by the RT analysis system 226. Additionally, the network conditions 608 may serve as labels for labeling (via the labeling system 506 of the training & testing data preparation system 502) the training data 508 (or testing data) for the AI learning System 510. As such, the network conditions 608 should be properly detected, defined, and characterized, such that they can be automatically detected and properly labeled in old and new simulated (synthesized) log-data, as shown in simulated log data 612. For example, a network condition (of the network conditions 608) may be characterized by one or more network parameter(s), and/or by a condition of one or more of particular type(s), including a network fault, a service fault, an SLA fault, a cyber-attack, a security breach, a cost-reduction opportunity, etc.

Figure 7:
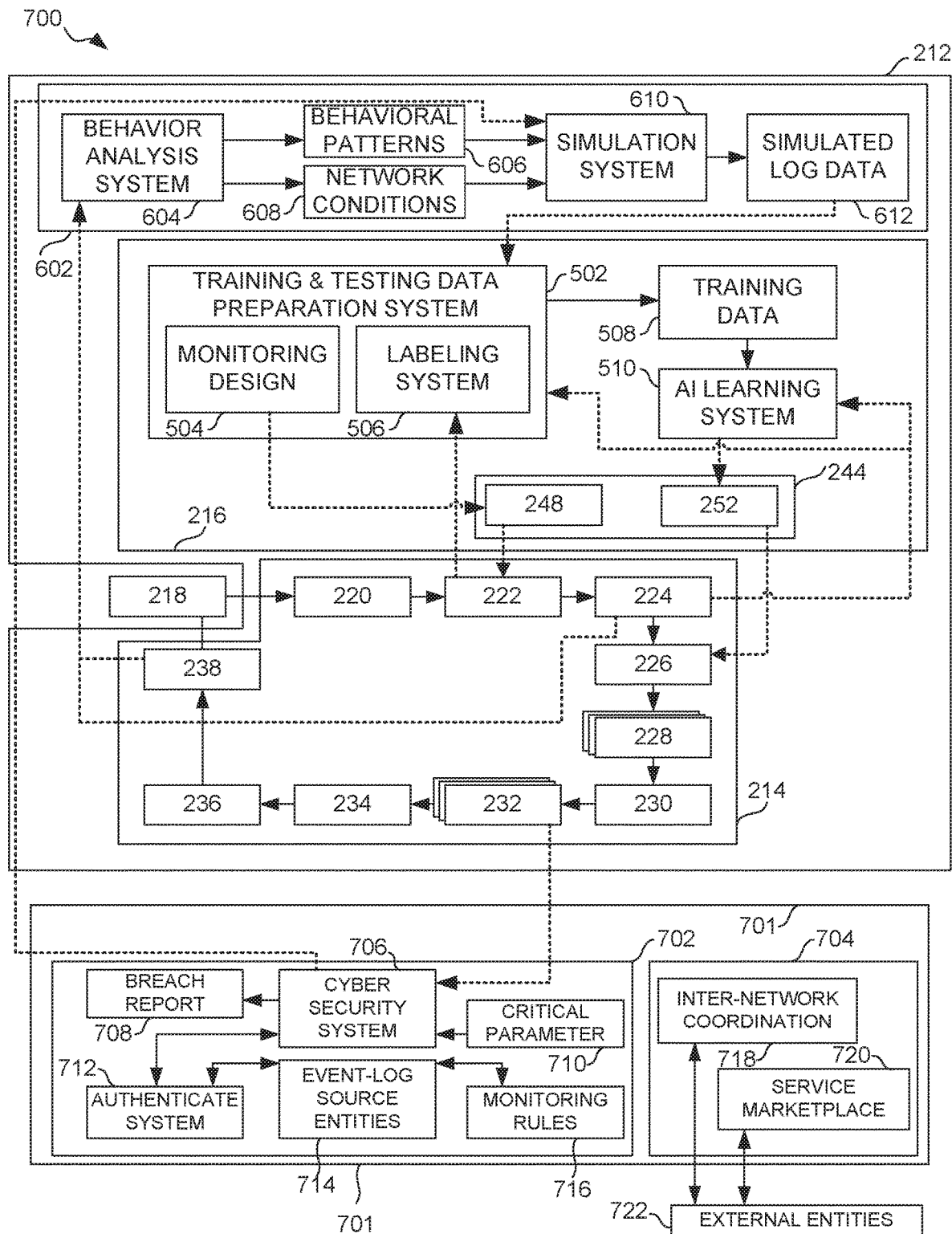
FIG. 7 illustrates a system, in accordance with one embodiment.

FIG. 7 illustrates a system 700, in accordance with one embodiment. As an option, the system 700 may be implemented in the context of any one or more of the embodiments set forth in any previous and/or subsequent figure(s) and/or description thereof. Of course, however, the system 700 may be implemented in the context of any desired environment. Further, the aforementioned definitions may equally apply to the description below.

As shown, a security module 702 and a coordination module 704 may relate to an exogenic level 701. The exogenic level 701 may be separate from the network management system 212, the run-time module 214, and/or the deep system module 216. In one embodiment, the exogenic level 701 may include any aspect foreign to the network management system 212, including but not limited to interaction with the outside world, other networks, other network management systems, cyber-attacks, and/or any other phenomena that is not intended as internal to the network management system 212.

The system 700 may relate to systems and functions that interact with the environment of the communication network 202. For example, coordination module 704 may include inter-network coordination 718 and service marketplace 720. In one embodiment, inter-network coordination may include coordinating load and configuration matters with neighboring networks, automatically negotiating with other networks and customers, mitigating cyber attacks, etc. Additionally, the inter-network coordination 718 and the service marketplace 720 may communicate with one or more external entities 722. For example, the external entities may include other networks, and/or network systems of customers.

The coordination module 704 therefore may involve computation(s) that depend on the current configuration of the network. In this manner, the coordination module 704 may relate to rules that apply to the current configurations, including current monitoring rules 248, current RT-analysis rules 252, current confidence analysis rules 256, current configuration rules 260, orchestration rules 266, current behavioral patterns 606, etc.

Any such rules of any layer/module/component of the network management system 212 may be exchanged with any external party (such as another network operator, a service provider, and/or a consumer), and/or transmitted to or received from any external party. Additionally, when negotiating network information with a third party (or third parties) any rule may be encrypted and embedded in the negotiation information. In one embodiment, the negotiation information may include the configuration and associated rules that apply to the network condition.

As shown, security module 702 may include a cyber security system 706 which may receive input from critical parameter 710, authenticate system 712, and one or more predicted situations 232. The security module 702 additionally includes an event-log source entities 714 which may be in communication with the monitoring rules 716. In one embodiment, the monitoring rules 716 may include monitoring rules 248. Further, the security module 702 may include a breach report 708 that receives an output from the cyber security system 706. The cyber security system may additionally provide output to the simulation system 610.

In various embodiments, although not shown in FIG. 7, the system 700 may also interact with various components of the network management system 500 and/or the network management system 600. For example, the inter-network coordination may interface with the behavior analysis system 604 and/or the configuration design system 518. In like manner, the service marketplace 720 may interface with the behavior analysis system 604 and/or the configuration design system 518.

Additionally, although the systems which control the network optimizing system 234 are not shown in FIG. 7, it is to be understood that such control systems/aspects are specifically shown in FIG. 5 and/or FIG. 6. Additionally, the training data 508 in FIG. 7 is not shown with an output, as the testing data 512 system is specifically not shown (but which is detailed in relation to FIG. 5 and/or FIG. 6). It is to be appreciated that any omissions of flow of instructions and/or data in FIG. 7 may be supplemented through FIG. 5 and/or FIG. 6. To simplify FIG. 7, aspects of FIG. 5 and/or FIG. 6 were omitted in FIG. 7 to more clearly show the system 700.

Further, data exchanged between systems and/or processes (such as exemplified in FIG. 7 and other figure) may be communicated indirectly, such as by memory, storage, data sharing facility, and/or a database system. A database system may be included within any of the modules, such as any component of the network management system 212. Further, the database system may include network configuration records, network situations associated with their respective network configurations, network situations associated with their respect minimum configuration time values, monitoring rules associated with network situations to which each monitoring rule is applicable, AI-models associated with their respective network situations, confidence levels and/or time periods associated with their respective AI-models and/or network situations, etc.

Figure 8:
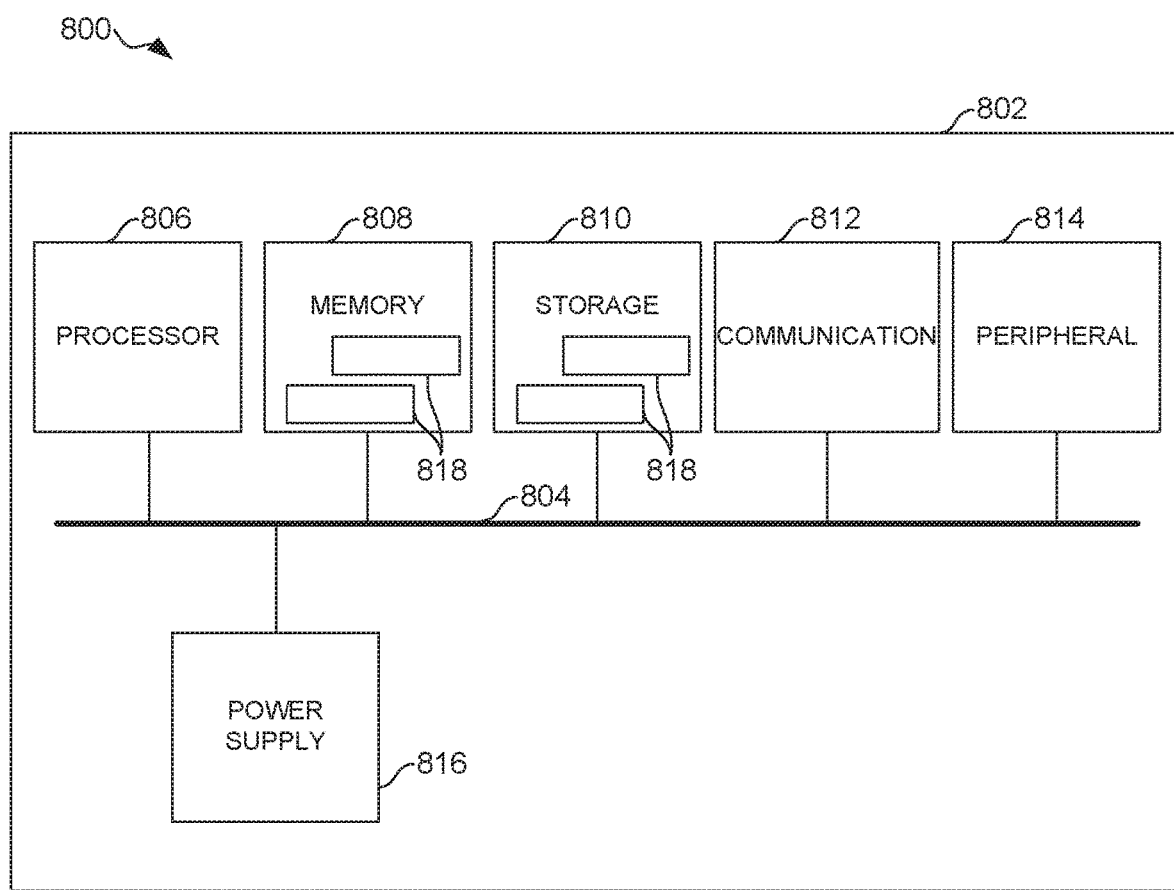
FIG. 8 illustrates a block diagram, in accordance with one embodiment.

FIG. 8 illustrates a block diagram 800, in accordance with one embodiment. As an option, the block diagram 800 may be implemented in the context of any one or more of the embodiments set forth in any previous and/or subsequent figure(s) and/or description thereof. Of course, however, the block diagram 800 may be implemented in the context of any desired environment. Further, the aforementioned definitions may equally apply to the description below.

As shown, block diagram 800 includes a computational device 802 which may be used for a network entity (such as network entities 218) and/or any computing element such as the network management system 212, the deep system module 216, etc., according to one exemplary embodiment. Additionally, the computational device 802 may include at least one processor unit 806, one or more memory units 808 (e.g., random access memory (RAM), a non-volatile memory such as a Flash memory, etc.), one or more storage units 810 (e.g. including a hard disk drive and/or a removable storage drive, representing a floppy disk drive, a magnetic tape drive, a compact disk drive, a flash memory device, etc.), one or more communication units 812, and/or one or more peripheral units 814 (or peripheral control units). The communication unit 812 may use any type of communication technology. Additionally, the computational device 802 may also include one or more communication buses 804 connecting any of the units of the computational device 802.

Further, the computational device 802 may also include one or more power supply units 816 providing power to any of the units of the computational device 802.

The computational device 802 may also include one or more computer programs 818, or computer control logic algorithms, which may be stored in any of the memory units 808 and/or storage units 810. Such computer programs, when executed, may enable the computational device 802 to perform various functions. Additionally, the memory units 808 and/or storage units 810 and/or any other storage may be a tangible computer-readable media.

Figure 9:
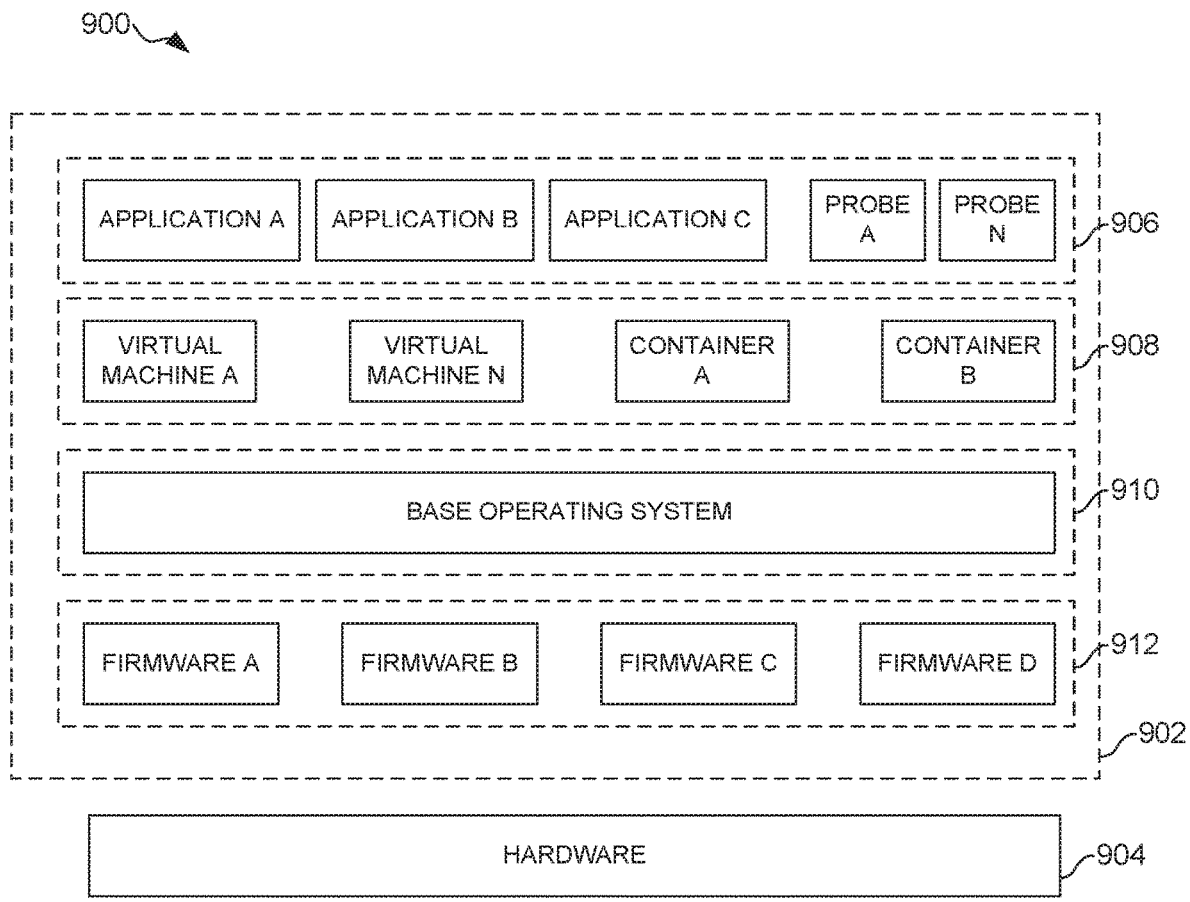
FIG. 9 illustrates a block diagram of software programs, in accordance with one embodiment.

FIG. 9 illustrates a block diagram 900 of a software programs, in accordance with one embodiment. As an option, the block diagram 900 may be implemented in the context of any one or more of the embodiments set forth in any previous and/or subsequent figure(s) and/or description thereof. Of course, however, the block diagram 900 may be implemented in the context of any desired environment. Further, the aforementioned definitions may equally apply to the description below.

In one embodiment, the block diagram 900 may be used by the computational device 802 such as part of the one or more computer programs 818 according to one exemplary embodiment. Additionally, computer programs 818 may operate over hardware 904, which may include hardware components as shown and described with reference to FIG. 8.

The computer programs 902 may include a first level of one or more firmware 912 software programs. The one or more firmware 912 may provide control of one or more hardware components (such as the storage unit 810, communication unit 812, and/or a peripheral unit 814). The computational device 802 may also include a second level of a base operating system 910. The base operating system 910 may provide control of memory units 808 and the hardware 904, typically via firmware 912, as well as communication and coordination between other components.

Additionally, the computer programs 902 may also include a third level 908 of a one or more virtual machines and/or containers. Each virtual machine may include one or more subordinate operating systems, as well as a library of functions. Each container may include subordinate operating systems as well as a library of functions.

The computer programs 902 may also include a fourth level 906 of one or more application software programs and/or probes. An application software program may be any of the software systems as herein described.

In one embodiment, a probe may include a software program that monitors and/or measures (and reports to a monitoring system such as the monitoring system 222) one or more operational parameters of any of the lower levels (such as the third level 908, the base operating system 910, and/or the firmware 912 of a first level), the hardware 904, and/or operating parameters of one or more applications. For example, an application or a probe may be executed over the base operating system 910 directly, over a virtual machine (typically executing a subordinate operating system), or embedded within a container (typically also embedding a subordinate operating system).

In various embodiments, the communication network and network management system of FIG. 2A may orchestrate (and/or manage, control) any component of any level of the computational device 802. Additionally, any component of any level of the computational device 802 may measure one or more operational parameters and report such within the event log 220, typically according to a monitoring rule (such as the monitoring rules 248), to the monitoring system 222. Further, the operations associated with network configuration, configuration change, reconfiguration, and/or migration, may refer to any software component of any level shown of the block diagram 900.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

In this respect, the SLA 210 or any similar descriptions of wanted and/or unwanted network behavior (e.g., cost saving, service fault, cyber-security attack/breech, etc.) may be used to define a corresponding one or more parametrized network situations. A network situation 1022 may be parametrized in the sense that it can be detected when the value of one or more operational parameters of the network reaches a particular threshold, etc.

The monitoring rules 248 may be devised and implemented in sufficient network entities 218 to report the pertinent parameters identifying the respective network situation. The network situation may be detected in the log data 224 of the communication network and properly labeled. The AI-learning system 510 may be used to detect a classifier (such as a log-pattern, or a pattern of event parameters reported by various network entities 218, where the log-pattern predicts a following network situation). In one embodiment, the AI-learning system 510 may operate in two steps where an unsupervised AI learning may search for a classifier and the AI-learning system 510 may then create an AI-model 244 to automatically detect a particular single classifier instance.

In one embodiment, an unsupervised AI learning may search for a classifier, such as a correlated repetition of patterns in the log data 224 preceding the network situation within a particular time range, wherein the time range may be statistically significant. Additionally, this may include a statistical process where the AI-learning system 510 may investigate a large number of instances of a particular type of network situation (as labeled) to identify a repetitive pattern of the log data 224 (which may be found immediately preceding the network situation within a particular time range), which may be identified as lead-time. It should be noted that there may be any number of different patterns of the log data 224 preceding a network situation type. In this sense, 'immediately' may mean within a predefined time range.

In one embodiment, the AI-learning system 510 may create an AI-model (such as the run-time rules and/or AI models 244) to automatically detect a particular single classifier instance wherein the classifier (or the associated network situation) may have a confidence level representing the probability that the detected classifier will indeed mature into a network situation within a time range about the lead-time.

It should be further noted that these two steps may be implemented as a single procedure performing these two steps as a combined iterative process of detecting the classifier and creating the AI-model.

In one embodiment, the product of the AI-learning system 510 may be an AI model that detects a particular classifier. Further, the classifier may be a pattern of data elements, and the AI-model is a piece of software (e.g., a neural network) that detects the particular pattern in a stream of log data, so that, although the classifier and the AI-model may be different, they may also be closely related. Thus, parameters associated with the classifier may be associated with the AI-model and vice versa.

In one embodiment, the classifier, and hence the respective AI-model, may include such parameters as the time of the classifier, an identification of a particular type of network situation that may follow the classifier, a lead-time, and possibly a time range, a confidence level, and parameter characterization. In the context of the present description, the term confidence level may refer to the probability that the identified network situation will mature within a predetermined time range. In one embodiment, the predetermined time range may be at the end of the lead-time following the time of the classifier. Other parameters may include parameters associated with a group of classifiers and/or AI-models, such as a resolution stage (level) and minimum reconfiguration time, which may be associated with the network situation, etc.

Although the classifier itself may be unknown, the AI-learning system 510 may provide some data about the classifier, such as the parameters that the AI-model may process to detect an identifier. Additionally, these parameters may form a parameter characterization data and, thus, the parameter characterization data of a particular AI-model may identify each such parameter by type, as well as the particular network entities reporting the particular parameter.

In one embodiment, while the AI-learning system 510 may scan for a lower resolution classifier, the AI-learning system 510 may be requested to look for a classifier with a lead-time longer than any higher resolution classifier. In another embodiment, while the AI-learning system 510 scans for a higher resolution classifier, the learning system may be requested to look for a classifier with higher confidence level than any lower resolution classifier. Therefore, the AI-learning system 510 may produce a multi-stage structure of AI-models with increasing resolution, increasing confidence level, and decreasing lead-time (and vice versa).

Figure 10:
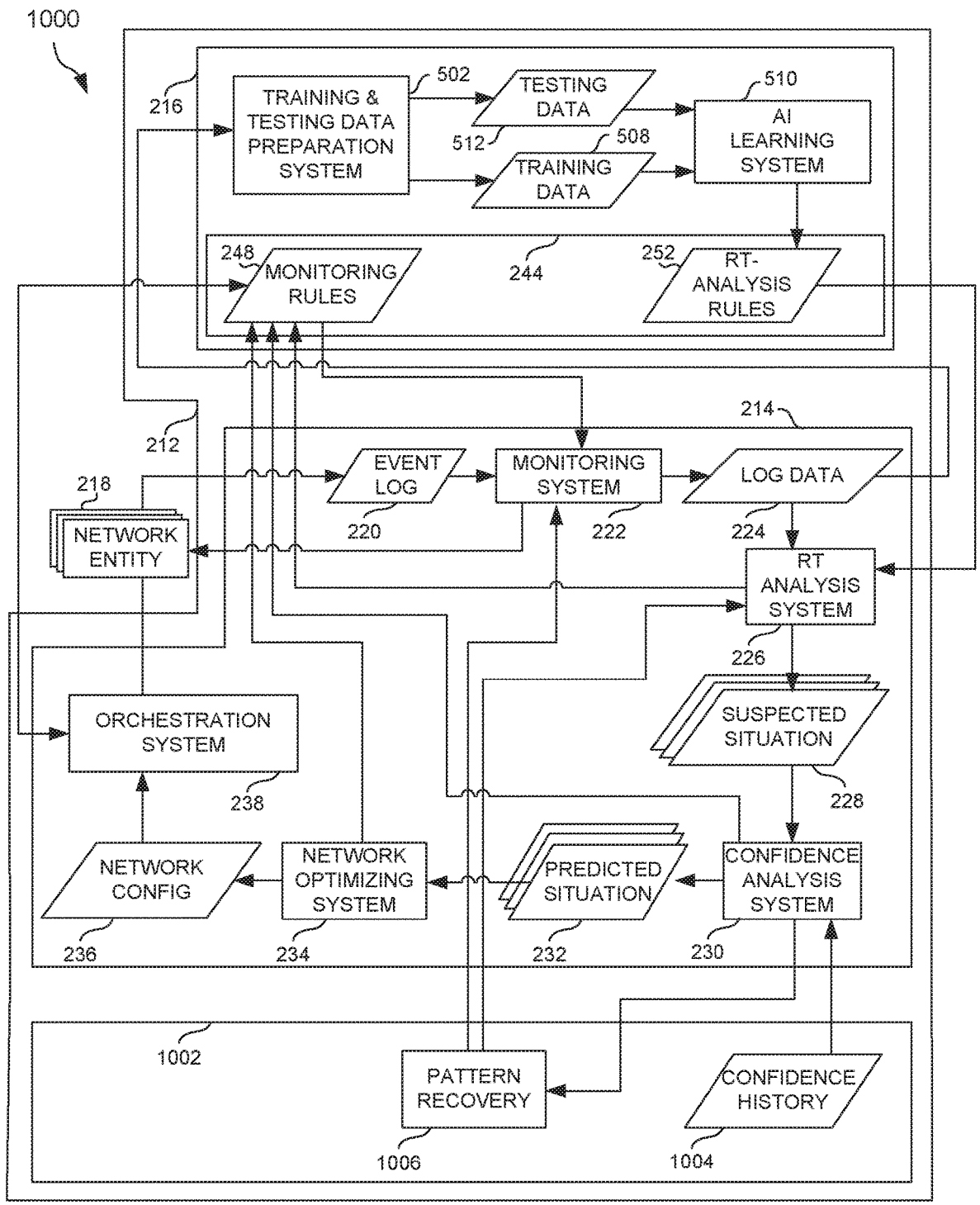
FIG. 10 illustrates a multi-stage analysis system, in accordance with one embodiment.

FIG. 10 illustrates a multi-stage analysis system 1000, in accordance with one embodiment. As an option, the multi-stage analysis system 1000 may be implemented in the context of any one or more of the embodiments set forth in any previous and/or subsequent figure(s) and/or description thereof. Of course, however, the multi-stage analysis system 1000 may be implemented in the context of any desired environment. Further, the aforementioned definitions may equally apply to the description below.

In one embodiment, the multi-stage analysis system 1000 may relate to the communication network 202 and, as shown, a network management system 212, using the run time module 214 (which may include a multi-stage AI analysis system), with confidence analysis system 230, in accordance with one embodiment.

In one embodiment, the communication network 202 may include a plurality of communication networks. Each (or a plurality of) communication network 202 may connect any number of devices associated with the customer 208 with any number of devices of the service operator 206.

Communication network 202 may have several types of customers, such as clients and service providers. In one embodiment, a client (including the customer 208) may consume a service provided by communication network 202 or by a third party service provider (including the service operator 206).

The customer 208 may execute any number of customer software packages. The service operator 206 may execute any number of service software packages. In one embodiment, the service software package may be provided by the same customer, by a different customer, and/or by a third party providing a software service (such as software-as-a-service (SaaS)). The service operator 206 may be operated by a customer's computing center, by a cloud operating entity, by a network operating entity such as being a part of the communication network, and/or by an edge computing operating entity, etc.

In another embodiment, the customers 208 and/or the service operator 206 may have one or more service level agreements (SLA) 210. In one embodiment, the SLA 210 may include any definition of a type, level, and/or quality of network service(s) the communication network 202 should provide for each and any of the customer 208, client, service, the service operator 206, etc.

The communication network 202 may include any type and number of network entities 218 arranged and interconnected in any particular configuration and/or topology. A network entity 218 may be a communication device, a computing device (with processing power, memory, storage, etc.), and/or a software program executed by the communication device and/or the computing device.

The network entities 218 may be arranged to provide services to the customers 208. The network entity 218 may be arranged to provide, or participate in, one or more services. A service may be provided by the network entity 218.

In one embodiment, communication and/or processing functions (in association with the network management system 212) may be provided as software executed by computing devices, such as Virtual Network Functions (VNFs) of a Network Function Virtualization (NFV).

The operation of the communication network 202, including the communication devices, the computing devices, the VNFs, etc. may be managed by the orchestration system 238 executing orchestration software. The orchestration system 238 may deploy software packages, such as micro-services and/or VNFs, in various communication devices and/or computing devices within the communication network.

The operation of the communication network, including the communication devices, the computing devices, the VNFs, etc. may be monitored by the monitoring system 222 executing monitoring software. The monitoring system 222 may collect the event log 220 data from the network entities 218 and produce the log data 224. The log data 224 may include a log database as well as a real time log stream. The monitoring system 222 may collect the event log 220 data and produce the log data 224 according to the monitoring rules 248.

The monitoring system 222 may manage the monitoring activity as well as the contents of the log data 224. For example, the management may be accomplished by communicating one or more of the monitoring rules 248 to the one or more network entities 218, or by instructing the one or more network entities 218 to report a status or events according to the one or more monitoring rules 248.

Additionally, the monitoring system 222 may also use the monitoring rules 248 to determine how to collect the event log 220 data. The monitoring system 222 may also use the monitoring rules 248 to determine how to compute statistical log data based on a plurality of data for a particular event log 220. Further, the monitoring system 222 may also use the monitoring rules 248 to determine how to structure the contents of log data 224 (including a log database and/or a real-time log stream). In various embodiments, the log data 224 may be divided into two streams, including a first stream that may be used by the AI learning system 510, and a second real-time stream that may be used by the RT analysis system 226. In this manner, therefore, the log data 224 may be divided into any number of streams. In other embodiments, a first stream may be used by the learning system, and may function as a database, from which training and testing log-data is derived. Additionally, a second stream may include RT log-data analyzed in real-time as it is provided by the monitoring system. This RT log-data may be provided as a number of streams, subject to the implementation of the multi-feed system.

The network orchestration system 238 may install and/or initiate one or more network entities 218 (such as a probe) to track and/or to analyze a behavior of the communication network 202 and to provide event log 220 according to the one or more monitoring rules 248.

In one embodiment, the RT analysis system 226 may integrate an artificial intelligence (AI) analysis system. Additionally, the RT analysis system 226 may process the log data 224 to detect a network situation that may require changing the network configuration 236 (and/or a reconfiguration of the network as provided by the network optimizing system 234). Upon detecting a network situation, the RT analysis system 226 may produce a predicted situation 232 data item and communicate it to the network optimizing system 234.

Based on the one or more of the received predicted situation 232 data items, the one or more SLAs 210, and/or any other information affecting configuration requirements of the network, the network optimizing system 234 may determine a new network configuration 236 (or a network reconfiguration) and communicate it to the orchestration system 238.

Based on new network configuration 236, the orchestration system 238 may deploy software packages. For example, the software packages may include micro-services, VNFs, and/or configuration-change data. Additionally, the software packages may be provided by a network analysis and configuration system executing network analysis and configuration software (including but not be limited to the network optimizing system 234 and/or the orchestration system 238).

In one embodiment, the configuration change may shift a processing load or communication load from one part of the communication network to another, so as to balance the processing or communication load and provide adequate service level. Additionally, the configuration may change based on near continual changing requirements of the network, and/or the network customer(s) 208. Alternatively, a configuration change may involve moving loads out of a particular (or group of) network entity 218 to enable orchestration system 238 to shut-down any of the network entities 218 to reduce a cost of operation.

Additionally, the configuration change may involve migration of one or more network entities 218. In one embodiment, the migration may occur without adversely affecting the continuity, and/or quality, etc., of the service provided by the migrated network entity 218. Further, migrating a network entity 218 may involve migrating a software network entity between hardware network entities. In one embodiment, the migration may involve installing a new copy of the migrated software network entity 218 in another hardware network entity, updating the new software network entity and verifying coherent operation, and discontinuing (e.g., removing) old, migrated, software network entity. These configuration changes may also involve splitting, joining, mirroring, etc., one or more network entities 218. As such, the term "migration" may include to any type of shifting processing and/or service throughout the network.

In one embodiment, the monitoring rules 248 may include rules communicated to the relevant network entities 218. For example, the monitoring rules 248 may include values of parameters and/or characteristics for a particular service, including a service with a particular temporal pattern. The event log 220 may report a value of a parameter, and/or a time in which the value of a parameter crossed a predetermined threshold value, etc.

The SLA 210 may include one or more threshold values for characteristics or parameters that a relevant network entity 218 may measure and report. The network orchestration system 238 may set the monitoring rules 248, according to the relevant SLA 210, and instruct the appropriate network entity 218 to measure and report (such as the event log 220) a particular parameter in an appropriate frequency. The network orchestration system 238, and/or the monitoring system 222 may instruct a network entity 218 to execute and report such measurements. Additionally, the network orchestration system 238 and/or the monitoring system 222 may install a special network entity 218, including but not be limited to a probe, to execute and report such measurements.

An SLA 210 may include one or more statistical threshold values, including for one or more characteristics or parameters. The statistical threshold value may refer, for example, to the number of occurrences of a value (or range of values) of a characteristic or parameter in a predefined period. In some embodiments, if a particular network entity 218 cannot calculate and/or report such statistical measure, the monitoring rule 248, as may be set by the orchestration system 238, may be applied by the monitoring system 222, which may compute the value, generate the event log 220, and add it to the log data 224.

As shown in FIG. 10, the RT analysis system 226 may be associated with several sub-systems. For example, in one embodiment, a run-time part may include the RT analysis system 226 and the confidence level 230.

The network management system 212, and/or any of its systems and sub-systems, may include human-interface(s) to enable an operator to supervise and/or intervene in, the operation of the network management system 212. In one embodiment, the human-interface(s) may enable an operator to induce reinforced learning. For example, the reinforced learning may be achieved by approving an automatic decision of the system, disapproving an automatic decision of the system, and/or enforcing a human decision.

The deep system module 216 may include a training and testing data preparation system 502 and an AI learning system 510. The training and testing data preparation system 502 may convert the log data 224 into the training data 508 and the testing data 512. For example, the training and testing data preparation system 502 may label or mark the log data 224, or a part of log data 224, with data-fields (or data-records) identifying a particular network situation.

The AI learning system 510 may then use the training data 508 (and the testing data 512) to create an AI model which may be found in the RT-analysis rules 252. In one embodiment, the AI model may be used to predict one or more network situations in the training data 508. Additionally, the AI model may include or be a predictor, which may be used to determine a particular pattern of log data 224 elements or records. Further, the log data 224 elements or records may precede a network situation early enough to initiate network reconfiguration.

In one embodiment, the AI model may detect a particular pattern of values, value ranges, and/or thresholds, etc. for parameters reported by particular network entities 218. Additionally, the AI model may detect values of parameters computed by the monitoring system 222, and which may be provided in the log data 224 (including as well a log database and/or a real-time log stream). The pattern of log data elements may be considered as a classifier for a particular network predicted situation 232. As such, a classifier may include at least one value of a parameter(s) of the event log 220 which may precede the network situation by a predetermined time period.

The AI run-time system 1002 may then use the AI model to analyze the log data 224 (including real-time log-data stream) to produce a predicted situation 232.

Additionally, the run-time system 1002 may be associated with the network management system 212 including the run time module 214 which may include the RT analysis system 226 and a confidence analysis system 230. The RT analysis system 226 may analyze the log data 224 (including but not be limited to a log database or a real-time log stream) to detect a suspected situation and produce a suspected situation 228 data. Each suspected situation 228 may indicate a cause and may be accompanied with one or more values representing a level of confidence of the validity of the particular situation.

The confidence analysis system 230 may process one or more suspected situation 228 data, produce a pattern recovery data 1006, and communicate the pattern recovery data 1006 to the monitoring system 222, to the orchestration system 238, and/or to the RT analysis system 226.

The confidence analysis system 230 may produce the pattern recovery data 1006 based, for example, on a confidence history 1004. The confidence history 1004 may record statistical parameters of a confidence level (or the development thereof) relating to a variety of suspected situations. These statistical parameters may include the probability that the confidence level of a particular suspected situation will increase, the time rate in which the confidence level of a particular suspected situation may increase, etc.

In one embodiment, the pattern recovery data 1006 may instruct the monitoring system 222 to use one or more particular monitoring rules 248. For example, the monitoring rule 248 may require the monitoring system 222 to investigate the event log 220 received from one or more particular network entities 218 and compare parameter values with a predetermined condition (such as a threshold value or range). If such condition is met, the monitoring system 222 may request any one or more particular network entities 218 to report measurement(s) of a parameter(s) for a particular time. As such, the pattern recovery 1006 may effect a particular predetermined synchronization between measurements of different various network entities 218. The synchronizing monitoring rules 248 may also be processed by network entities 218.

The orchestration system 238 may deploy software packages (including but not limited to micro-services and/or VNFs) in various communication devices and/or computing devices within the network management system 212. The orchestration system 238 may deploy the software packages according to configuration data and/or configuration-change data, provided by a network analysis and configuration system (such as the network optimizing system 234 and/or the orchestration system 238) executing network analysis and configuration software. The configuration change may shift processing load and/or communication load from one part of the communication network to another so as to balance the load and provide adequate service level according to the ever changing requirements of the network customers.

The RT analysis system 226, the network optimizing system 234, and/or the network orchestration system 238 may create a new monitoring rule 248, delete the monitoring rule 248, and/or modify a parameter of the monitoring rule 248. The modifications to the monitoring rules 248 may be associated and/or follow a predicted situation 232, and or a new network configuration 236, and or a configuration change. For example, the run-time system 1002 of the network management system 212 may modify one or more monitoring rules 248 to obtain more detailed log data 224 so as to increase (or decrease) a level of confidence of a predicted situation 232.

To improve the ability of the network management system 212 to detect or predict load-changes, the RT analysis system 226 and/or the orchestration system 238 may make changes to the monitoring rules 248, for example, by changing a rate of monitoring a function, and/or by changing a threshold for reporting a change of a particular parameter monitored, etc.

As such, the deep system module 216 may amend the monitoring rules 248, and/or produce new monitoring rules 248, to have more detailed patterns leading to a fault situation and/or fault events. In this manner, one or more predictors of network situations may be more effectively and accurately generated.

Figure 11:
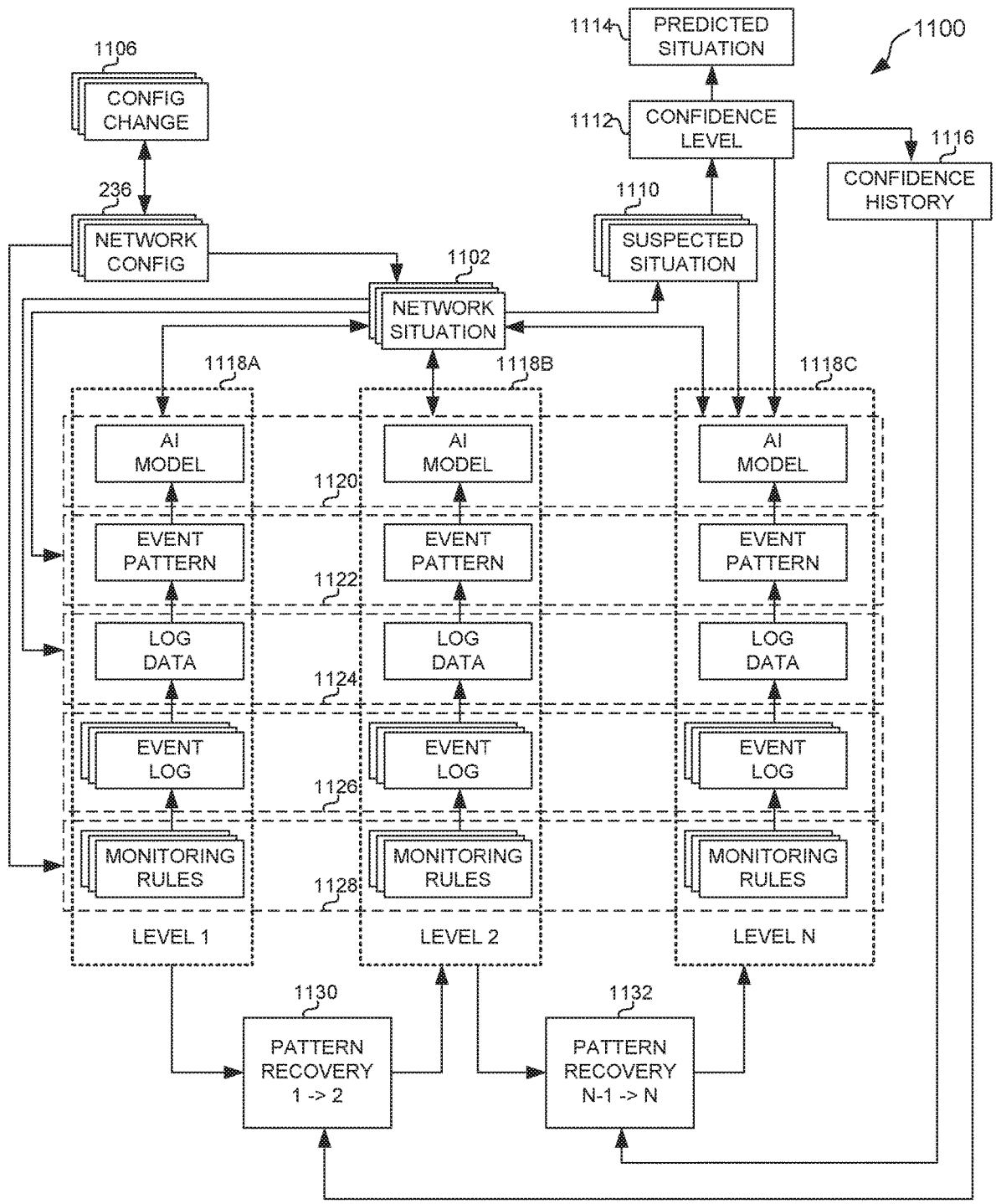
FIG. 11 illustrates a data structure, in accordance with one embodiment.

FIG. 11 illustrates a data structure 1100, in accordance with one embodiment. As an option, the data structure 1100 may be implemented in the context of any one or more of the embodiments set forth in any previous and/or subsequent figure(s) and/or description thereof. Of course, however, the data structure 1100 may be implemented in the context of any desired environment. Further, the aforementioned definitions may equally apply to the description below.

As shown, the data structure 1100 includes three levels, including level 1 1118A, level 2 1118B, and level N 1118C. Of course, it to be appreciated that any number of levels may be implemented. In one embodiment, level 1 1118A, level 2 1118B, and level N 1118C may correspond with three levels of resolution of the log data 224 and corresponding AI-models.

In one embodiment, a data structure may include a data record representing a particular configuration, such as the network configuration 236. Additionally, any number of network configuration 236 records may be included in the data structure, where each network configuration 236 may represent a particular network configuration 236.

As shown, a network configuration 236 record may be associated with a configuration change 1106 representing a change of the network configuration from a previous network configuration 236.

The network configuration 236 may also be associated with a set of monitoring rules 1128 and with a set of network situations 1102. In one embodiment, the monitoring rules 1128 may include the monitoring rules 248. Additionally, the monitoring rules 1128 may instruct the network entities 218 and/or the network monitoring system 222 how to measure and report event logs 1126 and create log data 224. In one embodiment, the event log 1126 may include the event log 220.

The training and testing data preparation system 502 may use a record describing a particular type of network situation to detect the network situations 1102 in the log data, and label the log data 224 to train the AI learning system 510 to create an AI model 1120 to detect the development of the network situations 1102 in the log data 224. The RT analysis system 226 may then use one or more AI models 1120 to identify a respective suspected situation 1110 and assign it with a particular confidence level 1112. In one embodiment, the suspected situation 1110 may include the suspected situation 228.

In one embodiment, the AI model 1120 may identify the network situations 1102 by detecting a corresponding classifier 1122 in the log data 1126. In one embodiment, the classifier 1122 may include but not limited to an event pattern or a log pattern. Additionally, the log data 1124 may include the log data 224. The confidence level 1112 may be computed based on values of the parameters of the corresponding classifier 1122 (including an event pattern). If the confidence level 1112 is above a predefined threshold value, the confidence analysis system 230 may produce a predicted situation 1114 record. In one embodiment, the predicted situation 1114 may include the predicted situation 232.

A communication network may have millions of network entities 218. Each network entity 218 may measure a variety of parameters each minute (or for any amount of time). These parameters may be communicated to the monitoring system 222 and properly stored in the log data 224, and then processed (analyzed) by the RT analysis system 226. In one embodiment, such flow of events may occur in real-time.

In one embodiment, each of the customers 208 of the communication network may have an SLA 210 (or a similar entity defining communication and/or processing requirements) with a network operator as well as SLAs 210 between the customers 208 and (third party) the service operators 206. Each of the SLA 210 may affect one or more of the network situations 1102. Additionally, each network situation 1102 may affect several classifiers 1122. In turn, the classifier 1122 may affect at least one AI model 1120.

As such, the RT analysis system 226, when analyzing the log data 1124, may operate a very large number of AI-models 1120, and which may occur in parallel or near in parallel. Each of the AI model 1120 may scan the log data 1124 (including the log data stream) for a particular pattern of data of several parameters within respective value ranges or thresholds. In one embodiment, this scan may be repeated. Additionally, it may occur in parallel and may be processed in real-time.

Measuring, communicating, storing and processing such large amounts of data in real-time may be highly impractical. Therefore, as shown in the data structure 1100, applying a multi-stage monitoring and multi-stage analysis may assist in processing such large amounts of data. In one embodiment, each stage may represent a different resolution of the amount and type of data measured, and/or communicated, and/or stored, and/or processed.

As shown, each level (corresponding with the level 1 1118A, the level 2 1118B, and the level N 1118C) may include the monitoring rules 1128, which may be used to collect the event log 1126, which in turn creates the log data 1124, which in turn, creates a classifier 1122 (including an event pattern), which in turn may be used to create an AI model 1120.

Additionally, there may be N levels (or stages) of resolution, which may correspond with any number of "N" levels. Further, each stage may have a particular set of monitoring rules 1128, which in turn may produce a different set of event log 1126 records. Each stage may then produce a different log data 1124 (including a data log stream), which in turn may carry a different set of event patterns classifiers 1122. In this manner, each level (or stage) may use a different set of AI models 1120 to detect the respective classifier 1122 (and/or event patterns).

In one embodiment, a default stage used by the network management system 212 may be level 1 1118A. Additionally, the stage 1 may include the lowest resolution (especially in comparison to the level 2 1118B and/or the level N 1118C). Additionally, the low resolution may imply that the network 202 may produce less event log 220 records per time unit (e.g., a second). This may in turn cause each network entity 218 to perform fewer measurements, which in turn may result in fewer measurements being reported and/or stored in the log data 224.

For example, fewer measurements may be made because the corresponding monitoring rule 248 may instruct a lower measurement frequency (repetition rate), a less sensitive reporting threshold, and/or a storage of a particular average of some measurements rather than the measurements themselves.

The monitoring rules 1128 for the level 1 1118A may be arranged to produce the classifier 1122 for each and every network situation 1102. In another embodiment, the monitoring rules 1128 for the level 1 1118A may be arranged to produce the training data 508 and testing data 502 labeled with the network situation 1102. In this manner, the AI learning system 510 may produce AI models 1120, where each AI model 1120 may detect at least one classifier 1122 for each corresponding network situation 1102.

In one embodiment, the AI model 1120 for the level 1 1118A may detect a corresponding network situation 1102 with relatively low confidence level 1112, which may be insufficient to determine a predicted situation 1114. In another embodiment, the AI learning system 510 may have produced an AI model 1120 that detects two or more network situations 1102. For example, the AI model 1120 may detect a classifier 1122 (or an event pattern) representing the two or more network situations 1102. In this embodiment, additional monitoring data may be needed to properly determine particular network situations 1102 with a sufficient confidence level 1112.

If the confidence analysis system 230 detects a suspected situation with a confidence level 1112 lower than a threshold value required to determine a predicted situation 232, the confidence analysis system 230 may produce a pattern recovery record 1006 and communicate it to the monitoring system 222, to the orchestration system 238, to the RT analysis system 226, and/or to any similar entity. In various embodiments, the pattern recovery record 1006 may affect a number of actions, as follows.

Action 1

In one embodiment, in response to the pattern recovery record 1006, the monitoring system 222 may resend the log data 224 with additional measurements. Additionally, these additional measurements may be reported and collected by the monitoring system 222. However, in one embodiment, the additional measurements may not be provided in the level 1 1118A log-data 1124 so as to reduce an amount of data and the respective processing load. For example, the monitoring system 222 may compute a particular parameter that may have been included in the level 1 1118A log-data 1124 including a combination of a plurality of parameters (including, for example, an average). Additionally, the combination may be computed based on a plurality of parameters of different types.

Action 2

In another embodiment, responsive to the pattern recovery record 1006, the monitoring system 222 may send to one or more network entities 218 one or more monitoring rules 248 requesting to report measurements that were collected by the network entity 218 and stored. Additionally, the report measurements may have been not reported but possibly used by the network entity 218 to compute a particular parameter that was reported to the monitoring system 222.

Action 3

Still yet, in one embodiment, responsive to the pattern recovery record 1006, the monitoring system 222 may request one or more network entities 218 to measure, collect, and/or report additional parameters, particular parameters in a higher frequency, particular parameters within a more sensitive threshold (or a range of parameters).

Action 4

In another embodiment, responsive to the pattern recovery record 1006, the monitoring system 222 may cause an effect of a synchronization between measurements of different types of parameters, or between measurements by different network entities 218. The synchronization may be simultaneous, in the sense that a plurality of parameters may be measured at the same time by the same network entity 218 or by different network entities 218. Additionally, the synchronization may be coincidental, in the sense that a particular parameter measurement (such as measuring a particular value like a threshold or range) may trigger the measurement of another parameter, or a sequence of such measurements, by the same network entity 218 or by different network entities 218. In this sense, the initiating measurement may be a combination of measurements.

As such, the pattern recovery record 1006 may include an identification of the one or more suspected situations 1110 for which the monitoring system 222 should initiate a respective higher level (such as moving from the level 1 1118A to the level 2 1118B) of monitoring rules 1128. Consequently, the RT analysis system 226 may use a respective higher level AI modules 1120.

The network management system 212 may therefore move from the level 1 1118A monitoring and analyzing to the level 2 1118B monitoring and analyzing. Of course, it is to be appreciated that there may be several different level 2 1118B schemes, where a level 2 1118B scheme may apply to one or more particular network situations 1102 that have been detected as a respective suspected situation 1110 with insufficient confidence level 1112. For any of such suspected situation 1110 with insufficient confidence level 1112 the confidence analysis system 230 may produce a respective pattern recovery record 1006 (shown in particular as pattern recovery 1→2 1130) which may transform respective monitoring rules 1128 into level 2 1118B monitoring and analysis. Additionally, in one embodiment, pattern recovery N−1>N 1132 may be additionally used as more than one level is used.

As such, the RT analysis system 226 may use one or more level 2 1118B AI models 1120 corresponding to the pattern recovery record(s) 1130 (and/or 1132), the new monitoring rules 1128, and/or the updated log data 1124.

Further stages of monitoring and analysis can be determined and escalated as needed to detect a suspected situation 1110 with sufficient confidence level 1112 while minimizing the burden of measuring, reporting, storing, and processing.

In one embodiment, the confidence analysis system 230 may be used to determine which suspected situation 1110 has a higher probability to develop a sufficient confidence level 1112, which level should be used to attain the sufficient confidence level 1112, and when to put into effect the required level.

The confidence analysis system 230 may determine a probability based on, for example, confidence history 1116. The confidence history 1116 may record statistical parameters of the development of confidence level 1112 of various suspected situations 1110 with respect to the levels (such as the level 1 1118A, the level 2 1118B, and/or the level N 1118C) used. The statistical parameters may include, for example, a probability that the confidence level 1112 of a particular suspected situation 1110 may increase, and/or a time rate in which the confidence level 1112 of a particular suspected situation 1110 may increase with respect to a particular level (such as the level 1 1118A, the level 2 1118B, and/or the level N 1118C) used.

Figure 12:
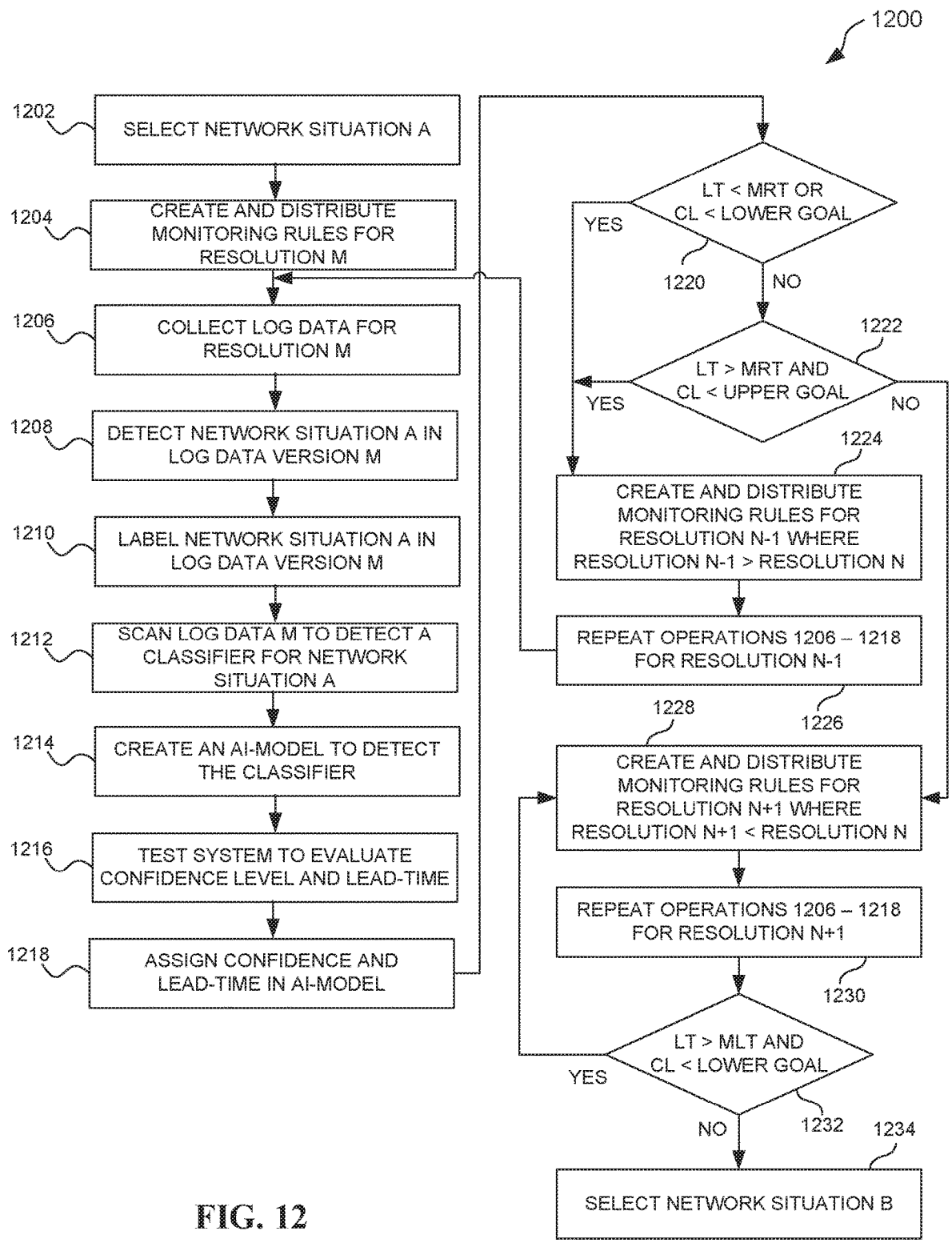
FIG. 12 illustrates a method for multi-stage monitoring and learning, in accordance with one embodiment.

FIG. 12 illustrates a method for multi-stage monitoring and learning 1200, in accordance with one embodiment. As an option, the method 1200 may be implemented in the context of any one or more of the embodiments set forth in any previous and/or subsequent figure(s) and/or description thereof. Of course, however, the method 1200 may be implemented in the context of any desired environment. Further, the aforementioned definitions may equally apply to the description below.

Figure 13A:
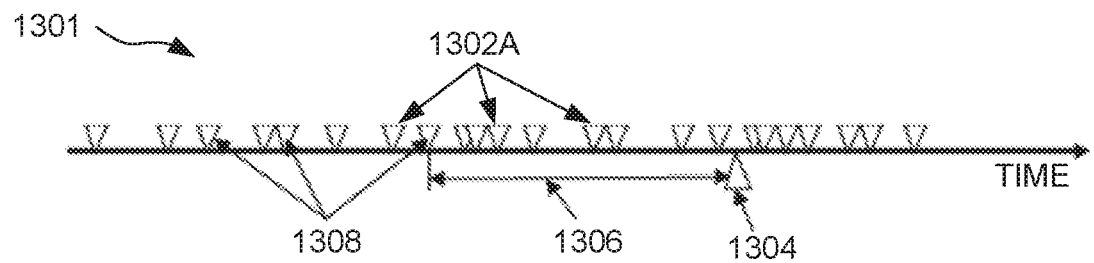
FIG. 13A illustrates a timeline, in accordance with one embodiment.
Figure 13B:
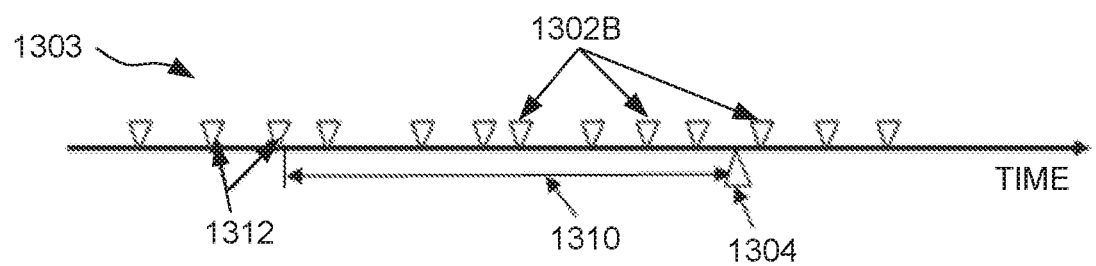
FIG. 13B illustrates a timeline, in accordance with one embodiment.
Figure 13C:
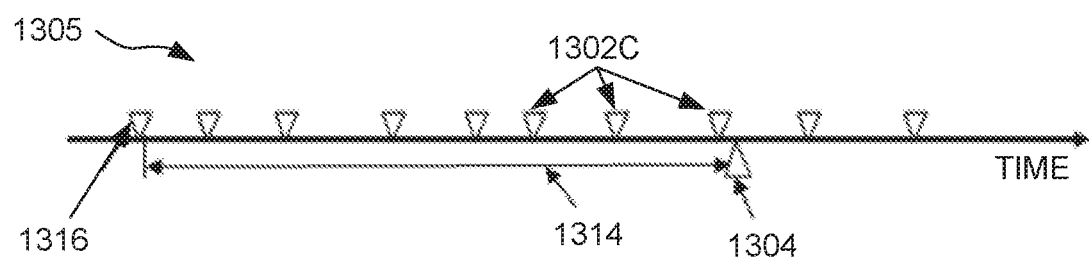
FIG. 13C illustrates a timeline, in accordance with one embodiment.

Additionally, FIGS. 13A, 13B, and 13C each illustrate a timeline 1301, 1303, and 1305, respectively, of log data as processed by a multi-stage monitoring and learning system, in accordance with one embodiment. As an option, the timeline 1301, 1303, and 1305 may be implemented in the context of any one or more of the embodiments set forth in any previous and/or subsequent figure(s) and/or description thereof. Of course, however, the timeline 1301, 1303, and 1305 may be implemented in the context of any desired environment. Further, the aforementioned definitions may equally apply to the description below.

Figure 14:
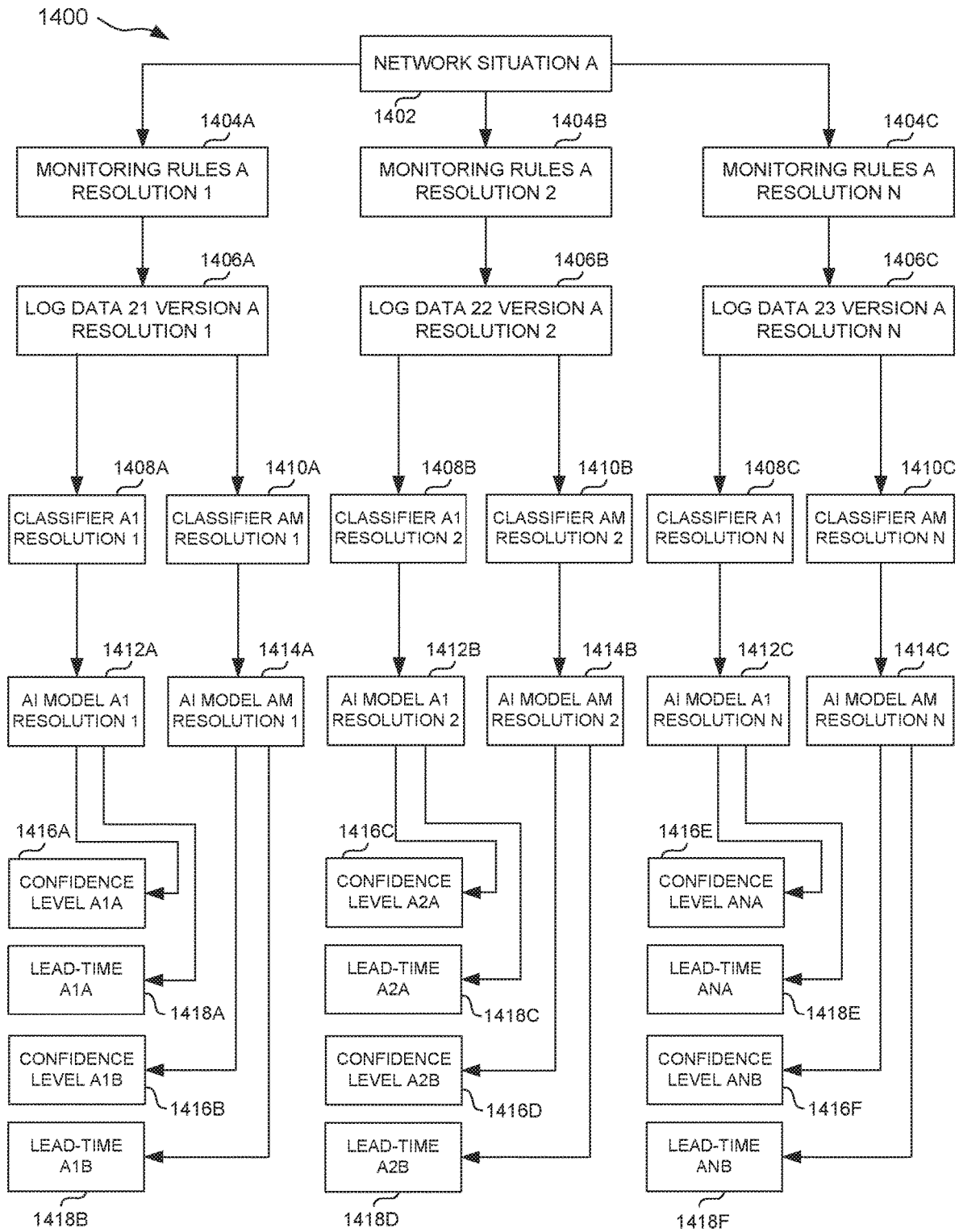
FIG. 14 illustrates a data structure produced by a multi-stage monitoring and learning system, in accordance with one embodiment.

Further, FIG. 14 illustrates a data structure 1400 produced by a multi-stage monitoring and learning system, in accordance with one embodiment. As an option, the data structure 1400 may be implemented in the context of any one or more of the embodiments set forth in any previous and/or subsequent figure(s) and/or description thereof. Of course, however, the data structure 1400 may be implemented in the context of any desired environment. Further, the aforementioned definitions may equally apply to the description below.

In one embodiment, the method 1200 may create a plurality of log data versions, then train an AI learning system 510 such that the AI learning system 510 may create a plurality of AI models 1122 for detecting the classifier(s) 1122 of the one or more network situations 1102. It is to be appreciated that any number of log versions may be possible. Additionally, while the log data versions 1301, 1303, and 1305 have one network situation and one classifier, any number of network situations and any number of classifiers associated with the log data may be possible. Further, each network situation 1102 and/or each classifier 1122 may have a respective number of log data versions with a respective number of AI models 1120.

As shown in FIG. 14, the data structure 1400 may include a plurality of network situations, monitoring rules, classifiers, and AI-models (as herein explained in reference to FIG. 11). For example, each network situation 1102 may associated with a plurality of sets of monitoring rules 1128, where each set of monitoring rules 1128 may produce a log data version of a different resolution, including at least one classifier 1122. The at least one classifier 1122 may have one or more AI models 1120 detecting the classifier 1122 in the respective log data version.

It is to be appreciated that a particular set of monitoring rules 1128 may accommodate a plurality of classifiers 1122 of a plurality of network situations 1102. Additionally, a classifier 1122 such as A1 may be associated with a same network situation 1102 labeled as the network situation A 1402. Of course, other classifiers 1122 may be associated with the network situation 1102 in the sense that a log pattern or event-pattern may be different due to different monitoring resolutions.

For example, a resolution 1 may indicate high resolution, a resolution 2 may indicate medium resolution, and a resolution N may indicate lowest resolution of respective log data versions 21, 22, and 23. In the context of the present description, a resolution refers to a density of event logs, and/or a number of event logs per a predetermined space of time. Additionally, log data version 21 of FIG. 14 may correspond with log data versions 1301, log data version 22 of FIG. 14 may correspond with log data version 1303, and log data version 23 of FIG. 14 may correspond with log data version 1305.

In particular, the network situation A 1402 may lead to monitoring rules A with resolution 1 1404A, monitoring rules A with resolution 2 1404B, and/or monitoring rules A with resolution N 1404C. Next, the monitoring rules may capture the log data 21 version A with resolution 1 1406A, log data 22 version A resolution A 1406B, and/or log data 23 version A with resolution A 1406C.

The log data version may then lead to a classifier. In particular, the log data 21 version A with resolution 1 1406A may lead to classifier A1 with resolution 1 1408A, and classifier AM with resolution A 1410A. The log data 22 version A resolution A 1406B may lead to classifier A1 with resolution 2 1408B, and classifier AM resolution 2 1410B. Further, the log data 23 version A with resolution A 1406C may lead to classifier A1 with resolution N 1408C, and classifier AM with resolution N 1410C.

The classifier may in turn lead to an AI model. In particular, the classifier A1 with resolution 1 1408A may lead to AI model A1 with resolution 1 1412A, which in turn may lead to a confidence level A1A 1416A and a lead-time A1A 1418A. The classifier AM with resolution 1 1410A may lead to AI model AM with resolution 1 1414A, which in turn may lead to a confidence level A1B 1416B, and a lead-time A1B 1418B.

The classifier A1 with resolution 2 1408B may lead to AI model A1 with resolution 2 1412B, which in turn may lead to a confidence level A2A 1416C and a lead-time A2A 1418C. The classifier AM with resolution 2 1410B may lead to AI model AM with resolution 2 1414B, which in turn may lead to a confidence level A2B 1416D, and a lead-time A2B 1418D.

Additionally, the classifier A1 with resolution N 1408C may lead to AI model A1 with resolution N 1412C, which in turn may lead to a confidence level ANA 1416E and a lead-time ANA 1418E. The classifier AM with resolution N 1410C may lead to AI model AM with resolution N 1414C, which in turn may lead to a confidence level ANB 1416F, and a lead-time ANB 1418F.

With respect to FIG. 13A, timeline 1301 includes a plurality of event log 1302A data and a label 1304 of a particular network situation. The particular network situation may be associated with a minimal time period representing the time to reconfigure the network per the particular network situation. The timeline 1301 may include a data version (such as the log data version 21 version A with resolution 1 1406A). Additionally, the timeline 1301 may include a classifier 1308 of one or more event log 1302A data, with a respective lead-time 1306 between the end of the classifier (time of a last log event of the classifier) and label 1304. In one embodiment, the timeline 1301 may represent the highest resolution, and the AI-model detecting the classifier 1308 may have the highest confidence level. Typically, a lead-time 1306 of the classifier 1308 may include a shorter lead-time, as the density of the event log 1302A is higher (in comparison to the timeline 1303 and the timeline 1305). In one embodiment, the timeline 1301 may include log data of a particular version.

In another embodiment, FIG. 13C includes the timeline 1305 with the lowest resolution (in comparison to the timeline 1301 and the timeline 1303). Consequently, log data of the timeline 1305 may include a smaller number or density, per time, of event log 1300 data. The event log 1302C may be different than the event log data of the other versions, carrying less, or different data. The classifier 1316 may have less data objects, such as event log 1302C data records. The AI-model for the classifier 1316 may also include a lower confidence level. However, the classifier 1316 may include the longest lead-time 1314 from the label 1304 of the same particular network situation. In one embodiment, the timeline 1305 may include log data of a separate particular version from the log data associated with the timeline 1301 and/or the timeline 1303.

Still yet, FIG. 14B includes the timeline 1303 where log data may have a median resolution, corresponding with a medium density of event log 1302B data carrying a medium amount of data. A classifier 1312 (or classifiers) may have a medium number of data objects. The AI-model for classifier 1312 may have a medium confidence level and a medium lead-time 1310.

With respect to FIG. 12, the method 1200 may include a multi-stage monitoring and learning process. In one embodiment, the method 1200 may start with an arbitrary medium resolution version of the log data 224 and then work towards a higher resolution and/or lower resolution version as needed to reach predetermined goals. In one embodiment, the predetermined goals may include predetermined values, and/or value ranges of confidence levels and respective lead-time periods. It is to be appreciated that the method 1200 may be an iterative and/or repetitive process. Additionally, the method 1200 may optimize the data structure 1400, for example, with respect to a confidence level and a lead-time produced by the AI-modules of the respective resolution level(s).

For example, the method 1200 may include creating a set of monitoring rules for a particular network situation A having a particular minimum reconfiguration time. This set of monitoring rules may be used to generate log data of a particular version at a specific resolution. The AI learning system 510 may then create one or more AI models 1120 detecting respective classifiers 1122 that predict a network situation A with a particular confidence level (CL), and a lead-time (LT) that is equal or greater than the minimum reconfiguration time (MRT) of the network situation A.

If, for example, the confidence level is less than a predetermined upper goal, or the lead-time is less than the minimum reconfiguration time, the method 1200 may include creating, for the same network situation A, a second set of monitoring rules having a higher resolution. The method 1200 may include repeating this process until the confidence level reaches the predetermined upper goal, and the lead-time is at least the minimum reconfiguration time.

Additionally, the method 1200 may also work down the resolution. For example, another set of monitoring rules having lower resolution may be created for the same network situation A, which may be used to work down the resolution. The AI learning system 510 may then create one or more AI-models 1120 detecting respective classifiers 1122 that predict network situation A with a particular confidence level and lead-time. In one embodiment, the confidence level may be lower than the confidence level of any higher resolution log data, but higher than a minimal predetermined value of the confidence level. Additionally, the lead time may be at least a value of the longest lead time for any of the higher-resolution log data versions.

In one embodiment, the method 1200 may define a first set of monitoring rules, where the first set of monitoring rules is used by at least one network entity of the communication network to create event log data of activity of the network. In one embodiment, the first set of monitoring rules may generate higher-resolution event log data, collect the event log data as log data of the activity of the network, define at least one network situation to be detected in the log data, and compute at least one AI-model, using the AI learning system 510. In one embodiment, the AI-model may enable the AI-analysis system 510 to detect the network situation in the log data.

Additionally, the method 1200 may define a second set of monitoring rules, where the second set of monitoring rules is used by at least one network entity of the communication network to create event log data of activity of the network. In one embodiment, the second set of monitoring rules may generate lower-resolution event log data than the first set of monitoring rules, collect the event log data as log data of the activity of the network, define at least one network situation to be detected in the log data, and compute at least one AI-model, using the AI learning system 510. In one embodiment, the AI-model may enable the AI-analysis system 510 to detect the network situation in the log data. The log data collected with the second set of monitoring rules may include less data elements than the log data collected with the first set of monitoring rules.

Further, the method 1200 may also compute a confidence level for the AI-model typically representing a probability that the respective classifier is within a predetermined time range. After computing a confidence level, the method 1200 may repeat in the form of defining a set of monitoring rules, collecting the event log data as log data, defining at least one network situation to be detected in the log data, and computing at least one AI model. Such steps may be repeated until the confidence level is more than a predetermined value. In a separate embodiment, such steps may be repeated as well until the confidence level is less than another predetermined value.

Still yet, the method 1200 may include comparing lead time periods, and accepting an AI model for lower-resolution log data if the respective lead-time period is larger than the lead-time period for a respective AI model of a higher-resolution log-data. The AI-models may detect a classifier preceding the network situation, where the classifier includes at least one value of at least one parameter of at least one event log preceding the network situation by a first time period.

As shown, operation 1202 includes selecting a particular network situation designated here as "network situation A". In the present embodiment, network situation A may be one of the network situations characterized for the current network configuration. The characteristics of network situation A may enable the creation of respective monitoring rules that measures relevant parameters and report them as event-log records (see operation 1204), which may be collected to form log data (see operation 1206). In one embodiment, the log data may be collected at a specific resolution, such as resolution medium ("M"). The characteristics of network situation A may enable the creation of one or more rules, or a similar mechanism, for detecting network situation A in log data of the network in the current configuration (see operation 1208). The characteristics of network situation A may also enable the formation of a label to designate an occurrence of network situation A in the log data (see operation 1210). The characteristics of network situation A may also enable the evaluation of the minimum reconfiguration time for repairing or exploiting the network situation A.

In one embodiment, the method 1200 may, for example, execute operations 1202, 1204, 1206, 1208, and 1210 for an arbitrary set of monitoring rules that may be considered as medium resolution and designated as log data M (such as, for example, the log data displayed in timeline 1303 of FIG. 13B). As such, the method 1200 may create training data (as well as testing data) for AI-learning system.

As shown, operation 1212 includes scanning log data M to detect a classifier for network situation A, and in turn, creating create an AI-model to detect the classifier (see operation 1214). Next, at operation 1216, confidence level and lead time of the detectable classifier with respect to network Situation A may be determined. Further, the confidence level and lead time are assigned to the AI model. See operation 1218. In one embodiment, such AI model may be used to detect the classifier.

At decision 1220, it is determined if the lead-time (LT) is less than the minimum reconfiguration time (MRT) for repairing or exploiting network situation A, and/or if the confidence level satisfies a predetermined minimum criterion.

If the lead-time is smaller than the minimum reconfiguration time, or if the confidence level is less than the minimum criterion (Lower Goal), the method 1200 may proceed to operation 1224 where monitoring rules are created and distributed for resolution N−1 where the resolution N−1 is greater than the resolution N. As such, the resolution level is increased. Additionally, operations 1206-1218 are then repeated for resolution N−1. See operation 1226.

If the lead-time is not smaller than the minimum reconfiguration time, or if the confidence level is not less than the minimum criterion, the method 1200 proceeds to decision 1222, where if the lead-time is greater than the minimum reconfiguration time, and/or if the confidence level is less than the maximum criterion (Upper Goal), then the method 1200 proceeds again to operation 1224, and then operation 1226.

However, if the upper goal of confidence level is achieved per decision 1222, the method 1200 may proceed to reduce the level of resolution per operation 1228. In particular, operation 1228 includes creating and distributing monitoring rules for resolution N+1 where resolution N+1 is less than a resolution N. Then, operations 1206 through 1218 may be repeated until a lower confidence level goal is reached, as shown in decision 1232. In particular, the decision 1232 may include determining whether the lead-time is greater than the minimum reconfiguration time and if the confidence level is less than a minimum criterion (Lower Goal). Additionally, decision 1232 may discard lower resolution systems (monitoring rules and AI-models) and may produce a lead-time shorter than the maximum lead-time being the longest lead-time of any of the higher resolution systems.

At operation 1234, the network situation B (or the following network situation) may be selected. In this manner, the method 1200 may be repeated for all network situations that may be characterized for the current network configuration.

In this respect, the SLA 210 or any similar descriptions of wanted and/or unwanted network behavior (e.g., cost saving, service fault, cyber-security attack/breech, etc.) may be used to define a corresponding one or more parametrized network situations of the network situation 1102. The network situation 1102 may be parametrized in the sense that it can be detected by one or more communication parameters, where the one or more communication parameters reached a particular threshold or value range, etc.

The monitoring rules 1128 may then be devised and implemented in sufficient network entities 218 to report the respective parameters identifying the respective network situation 1102. The network situation 1102 may then be detected in the log data 1124 of the communication network and properly labeled. The AI learning system 510 may then be used to detect a classifier 1122, namely a log-pattern, or a pattern of event parameters reported by various network entities 218, where the log-pattern happens to predict a following network situation. The AI learning system 510 may operates in two steps.

In step 1, —unsupervised AI learning may search for a classifier 1122, such as a correlated repetition of log-patterns preceding the network situation 1102 within a particular time range, which may be statistically significant. This may be a statistical process where the AI learning system 510 may investigate a large number of instances of the particular type of network situation 1102 (as labeled) to identify a repetitive log-pattern typically preceding the network situation 1102 within a particular time range, which may be identified as lead-time. There may be any number of different log-patterns preceding a network situation type.

In step 2, the AI learning system 510 may create an AI-model 1120 to automatically detect a particular single classifier instance. The classifier 1122 (or the associated network situation 1102) may have a confidence level 1112 representing a probability that the detected classifier 1122 may mature into a network situation within a time range about the lead-time.

It is to be appreciated that step 1 and step 2 may be implemented as a single procedure performing these two steps as a combined iterative process of detecting the classifier and creating the AI model 1120.

Additionally, in one embodiment, a product of the learning system is the AI model 1120 that detects the particular classifier 1122. The classifier 1122 may be a pattern of data elements, and the AI model 1120 may be a piece of software (e.g., a neural network) that detects the particular pattern in a stream of the log data 1124, so although the classifier 1122 and the AI model 1120 may be different, they may be closely related. Therefore, parameters associated with the classifier 1122 may be associated with the AI model 1120 and vice versa.

The classifier 1122, and hence the respective AI-model 1120 may have but not be limited to the following parameters: time of the classifier, an identification of a particular type of network situation that may follow the classifier, a lead-time, a time range, a confidence level, and/or parameter characterization. A configuration level may represent a probability that the identified network situation may mature within the time range at the end of the lead-time following the time of the classifier. Further parameters may include parameters associated with a group of classifiers and/or AI models, such as but not limited to resolution stage (level), minimum reconfiguration time (which may be associated with the network situation), etc.

Though the classifier 1122 may be unknown, the AI learning system 510 may provide some data about the classifier 1122, such as the parameters that the AI model 1120 may process to detect the identifier. These parameters may form the parameter characterization data. Therefore, the parameter characterization data of a particular AI model may identify each such parameter by type, as well as the particular network entities 218 reporting the particular parameter.

When the AI learning system 510 scans for a lower resolution classifier, the AI learning system 510 may be requested to look for a classifier with a lead-time longer than any higher resolution classifier. When the AI learning system 510 scans for a higher resolution classifier, the AI learning system 510 may be requested to look for a classifier with higher confidence level than any lower resolution classifier. Therefore, the AI learning system 510 may produce a multi-stage structure of the AI models 1120 with increasing resolution, increasing confidence level, and decreasing lead-time (and vice versa).

In one embodiment, the RT analysis system 226 may detect a lower-resolution classifier, and at such detection, there may be a higher-resolution classifier associated with a higher confidence level and sufficient lead-time. Therefore, if the higher resolution AI-model detects a respective classifier it may have lead time longer than the minimum reconfiguration time for the particular network situation in the particular configuration.

Additionally, for a particular type of network situation 1102, there is a multi-stage structure of stratified resolutions, where within each resolution level/stage, there may be any number of AI models/classifiers (to be processed in parallel). In one embodiment, each of the AI models may have a respective lead-time and confidence level. However, in another embodiment, lower resolution AI models may have lower confidence level (to ensure low probability of false negative detection) and longer lead-time (to enable operating the higher resolution AI model in time).

Each of the network situation 1102 may have its own multi-stage resolution structure having a plurality of levels of resolution. Each resolution level may include one or more AI models 1120, and one or more monitoring rules 1128 to produce the log data 1124 that the respective AI model 1120 may process to identify the respective classifiers 1122 to predict the network situation 1102 with a respective confidence level 1112 (probability of occurrence within a respective time range).

Figure 15:
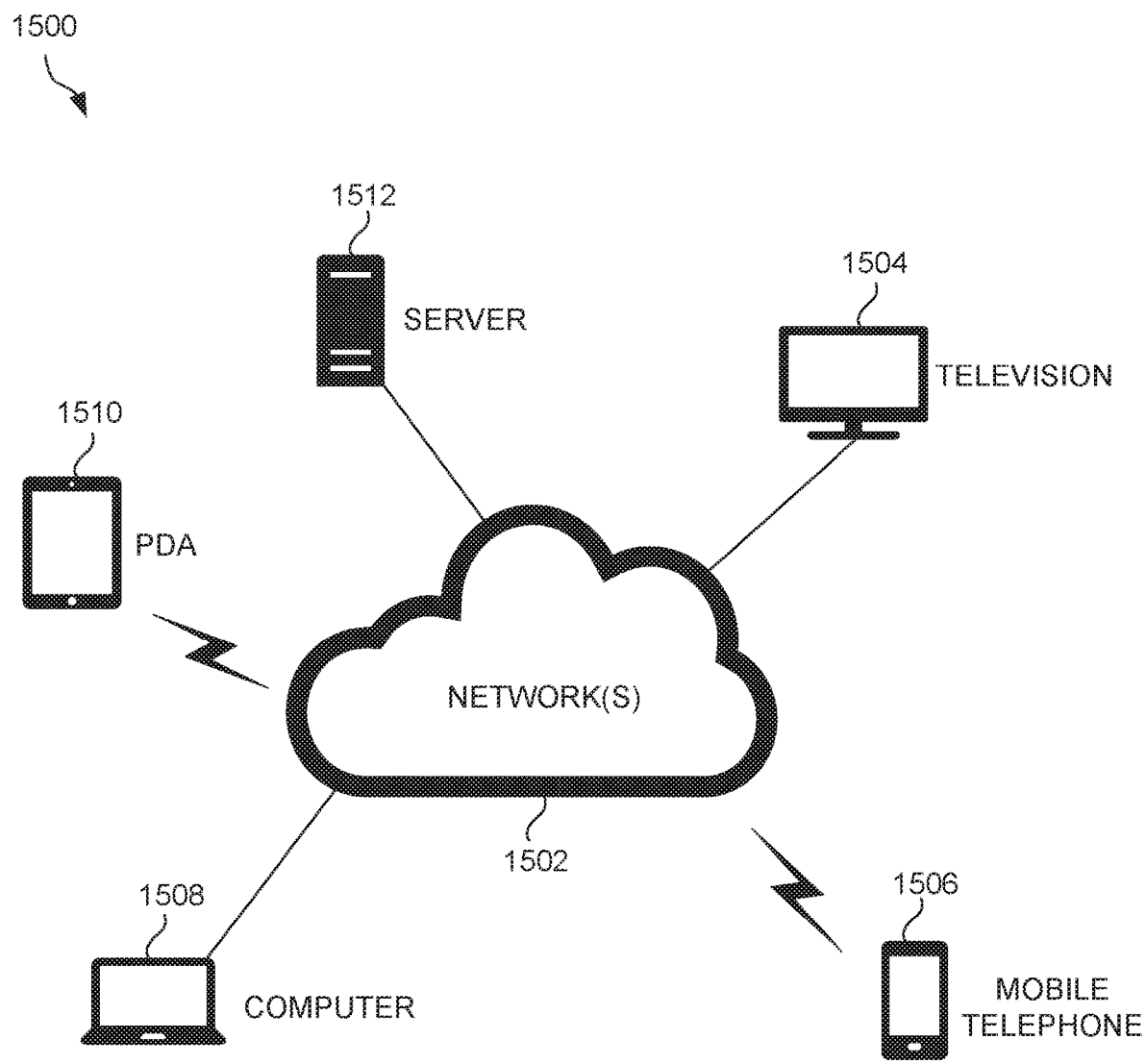
FIG. 15 illustrates a network architecture, in accordance with one possible embodiment.

FIG. 15 illustrates a network architecture 1500, in accordance with one possible embodiment. As shown, at least one network 1502 is provided. In the context of the present network architecture 1500, the network 1502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1502 may be provided.

Coupled to the network 1502 is a plurality of devices. For example, a server computer 1512 and an end user computer 1508 may be coupled to the network 1502 for communication purposes. Such end user computer 1508 may include a desktop computer, lap-top computer, and/or any other type of logic. Still yet, various other devices may be coupled to the network 1502 including a personal digital assistant (PDA) device 1510, a mobile phone device 1506, a television 1504, etc.

Figure 16:
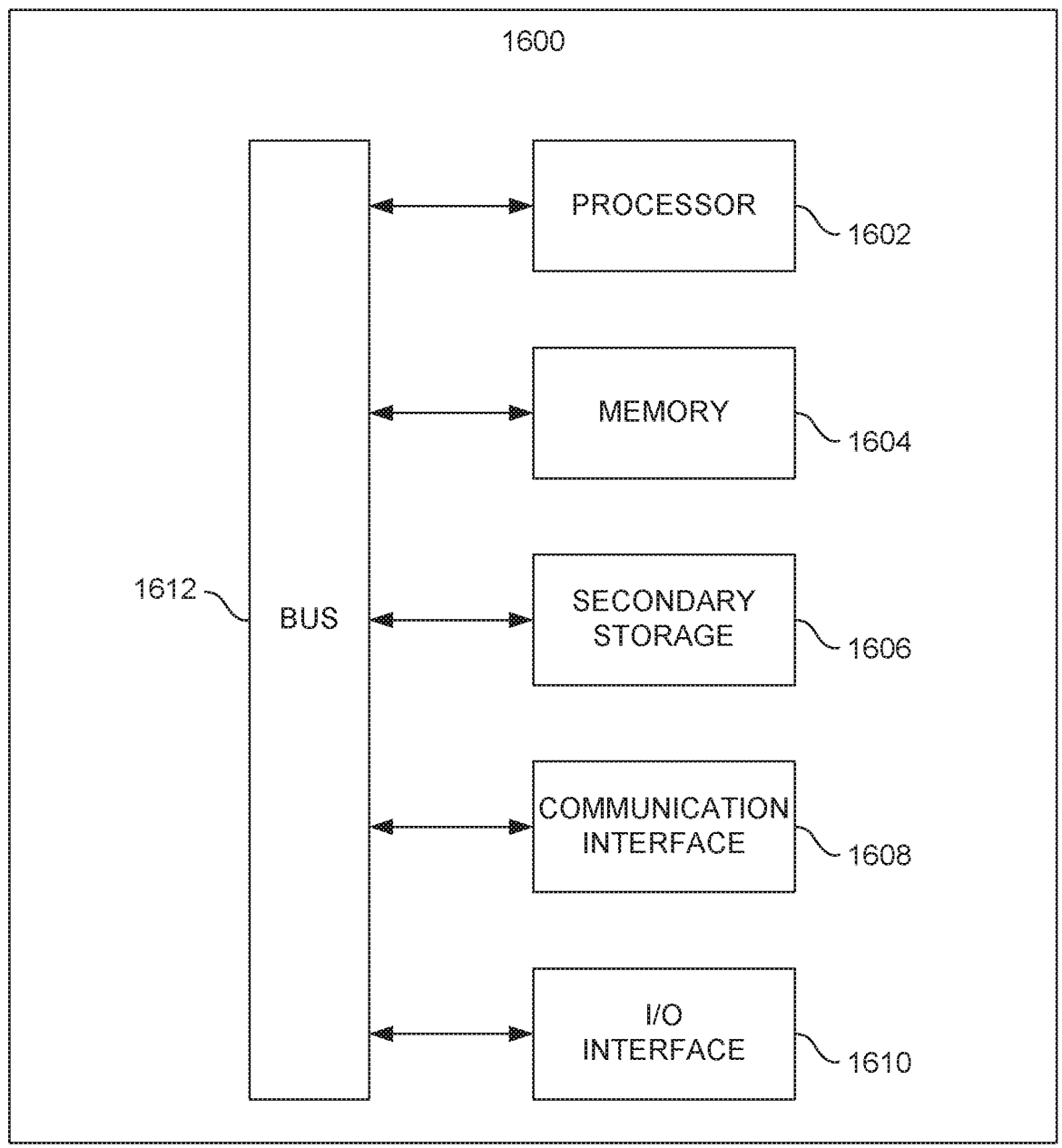
FIG. 16 illustrates an exemplary system, in accordance with one embodiment.

FIG. 16 illustrates an exemplary system 1600, in accordance with one embodiment. As an option, the system 1600 may be implemented in the context of any of the devices of the network architecture 1500 of FIG. 15. Of course, the system 1600 may be implemented in any desired environment.

As shown, a system 1600 is provided including at least one central processor 1602 which is connected to a communication bus 1612. The system 1600 also includes main memory 1604 [e.g. random access memory (RAM), etc.]. The system 1600 also includes a graphics processor 1608 and a display 1610.

The system 1600 may also include a secondary storage 1606. The secondary storage 1606 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1604, the secondary storage 1606, and/or any other memory, for that matter. Such computer programs, when executed, enable the system 1600 to perform various functions (as set forth above, for example). Memory 1604, storage 1606 and/or any other storage are possible examples of non-transitory computer-readable media. It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product comprising computer executable instructions stored on a non-transitory computer readable medium that when executed by a processor instruct the processor to:
  define a first set of monitoring rules used by at least one network entity of a communication network, wherein the first set of monitoring rules cause event log data to be collected with a first level of detail;
  collect first event log data of first network activity of the communication network based on the first monitoring rules, the first event log data having the first level of detail;
  define a first network situation corresponding to the network activity;
  compute a first artificial intelligence (AI) model based on the first event log data having the first level of detail and the first network situation, wherein the first AI model is configured to predict the first network situation from the first event log data with:

a first confidence level that the first network situation will be correctly predicted, and
a first lead-time;
determine that the first confidence level achieves an upper confidence level goal;
determine that a second AI model with a lead-time longer than the first lead-time is to be computed, as a result of determining that the first confidence level achieves the upper confidence level goal;
responsive to determining that the second AI model with the lead-time longer than the first lead-time is to be computed, define a second set of monitoring rules used by the at least one network entity, wherein the second set of monitoring rules cause event log data to be collected with a second level of detail that is lower than the first level of detail;
collect second event log data of the first network activity of the communication network based on the second monitoring rules, the second event log data having the second level of detail; and
compute the second AI model based on the second event log data having the second level of detail and the first network situation, wherein the second AI model is configured for detecting the first network situation in the second event log data with:
a second confidence level that is lower than the first confidence level and that is higher than a minimal predetermined confidence level, and
a second lead-time that is longer than the first lead-time.

2. The computer program product of claim 1, wherein the computer program product is configured to use the first AI model to detect the first network activity.

3. The computer program product of claim 1, wherein the computer program product is configured to use the second AI model to detect the first network activity.

4. The computer program product of claim 1, wherein the first AI model detects a first classifier preceding the first network situation, where the first classifier includes at least one first parameter found in first prior event log data collected before the first network situation by a first time period.

5. The computer program product of claim 4, wherein the second AI model detects a second classifier preceding the first network situation, where the second classifier includes at least one second parameter found in second prior log data collected before the first network situation by a second time period.

6. The computer program product of claim 5, wherein the first time period is smaller than the second time period.

7. A method, comprising:
defining a first set of monitoring rules used by at least one network entity of a communication network, wherein the first set of monitoring rules cause event log data to be collected with a first level of detail;
collecting first event log data of first network activity of the communication network based on the first monitoring rules, the first event log data having the first level of detail;
defining define a first network situation corresponding to the network activity;
computing a first artificial intelligence (AI) model based on the first event log data having the first level of detail and the first network situation, wherein the first AI model is configured to predict the first network situation from the first event log data with:
a first confidence level that the first network situation will be correctly predicted, and
a first lead-time;
determining that the first confidence level achieves an upper confidence level goal;
determining that a second AI model with a lead-time longer than the first lead-time is to be computed, as a result of determining that the first confidence level achieves the upper confidence level goal;
responsive to determining that the second AI model with the lead-time longer than the first lead-time is to be computed, defining a second set of monitoring rules used by the at least one network entity, wherein the second set of monitoring rules cause event log data to be collected with a second level of detail that is lower than the first level of detail;
collecting second event log data of the first network activity of the communication network based on the second monitoring rules, the second event log data having the second level of detail; and
computing the second AI model based on the second event log data having the second level of detail and the first network situation, wherein the second AI model is configured for detecting the first network situation in the second event log data with:
a second confidence level that is lower than the first confidence level and that is higher than a minimal predetermined confidence level, and
a second lead-time that is longer than the first lead-time.

8. A device, comprising:
a non-transitory memory storing instructions; and
one or more processors in communication with the non-transitory memory, wherein the one or more processors execute the instructions to:
define a first set of monitoring rules used by at least one network entity of a communication network, wherein the first set of monitoring rules cause event log data to be collected with a first level of detail;
collect first event log data of first network activity of the communication network based on the first monitoring rules, the first event log data having the first level of detail;
define a first network situation corresponding to the network activity;
compute a first artificial intelligence (AI) model based on the first event log data having the first level of detail and the first network situation wherein the first AI model is configured to predict the first network situation from the first event log data with:
a first confidence level that the first network situation will be correctly predicted, and
a first lead-time;
determine that the first confidence level achieves an upper confidence level goal;
determine that a second AI model with a lead-time longer than the first lead-time is to be computed, as a result of determining that the first confidence level achieves the upper confidence level goal;
responsive to determining that the second AI model with the lead-time longer than the first lead-time is to be computed, define a second set of monitoring rules used by the at least one network entity, wherein the second set of monitoring rules cause event log data to be collected with a second level of detail that is lower than the first level of detail;

collect second event log data of the first network activity of the communication network based on the second monitoring rules, the second event log data having the second level of detail; and compute the second AI model based on the second event log data having the second level of detail and the first network situation, wherein the second AI model is configured for detecting the first network situation in the second event log data with:
- a second confidence level that is lower than the first confidence level and that is higher than a minimal predetermined confidence level, and
- a second lead-time that is longer than the first lead-time.

9. The computer program product of claim 1, further comprising:
determine whether the second confidence level reaches a lower confidence level goal and whether the second lead-time is greater than a minimum reconfiguration time; and
determine that a third AI model is to be computed, as a result of determining that the second confidence level does not reach the lower confidence level goal and that the second lead-time is greater than the minimum reconfiguration time.

10. The computer program product of claim 9, further comprising:
responsive to determining that the third AI model with the lead-time longer than the first lead-time is to be computed, define a third set of monitoring rules used by the at least one network entity, wherein the third set of monitoring rules cause event log data to be collected with a third level of detail that is lower than the second level of detail;
collect third event log data of the first network activity of the communication network based on the third monitoring rules, the third event log data having the third level of detail; and
compute the third AI model based on the third event log data having the third level of detail and the first network situation, wherein the third AI model is configured for detecting the first network situation in the third event log data with:
- a third confidence level that is lower than the second confidence level and that is higher than the minimal predetermined confidence level, and
- a third lead-time that is longer than the first lead-time.

11. The computer program product of claim 1, wherein the lead-time includes a time period between a first time of a detection of a classifier in event log data and a second time that the first network situation is predicted to occur.

* * * * *